(12) United States Patent
Dridi et al.

(10) Patent No.: US 12,008,436 B2
(45) Date of Patent: *Jun. 11, 2024

(54) MACHINE LEARNING MAPPING FOR QUANTUM PROCESSING UNITS

(71) Applicant: Quantum Computing Inc., Leesburg, VA (US)

(72) Inventors: Raouf Dridi, Leesburg, VA (US); Uchenna Chukwu, Leesburg, VA (US); Jesse Berwald, Leesburg, VA (US)

(73) Assignee: Quantum Computing Inc., Leesburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,198

(22) Filed: Jun. 30, 2022

(65) Prior Publication Data

US 2023/0206109 A1 Jun. 29, 2023

Related U.S. Application Data

(63) Continuation of application No. 17/560,816, filed on Dec. 23, 2021, now Pat. No. 11,436,519.

(51) Int. Cl.
*G06N 10/00* (2022.01)
*G06N 10/60* (2022.01)
*G06N 20/00* (2019.01)

(52) U.S. Cl.
CPC ............. *G06N 10/60* (2022.01); *G06N 20/00* (2019.01)

(58) Field of Classification Search
CPC ......... G06N 10/00; G06N 10/60; G06N 20/00
See application file for complete search history.

(56) References Cited

U.S. PATENT DOCUMENTS

| | | | | |
|---|---|---|---|---|
| 2009/0070402 A1* | 3/2009 | Rose | ...................... | G06N 10/00 709/201 |
| 2012/0254586 A1* | 10/2012 | Amin | ...................... | G06N 10/00 712/E9.002 |
| 2017/0017894 A1* | 1/2017 | Lanting | ................... | G06F 15/82 |

(Continued)

FOREIGN PATENT DOCUMENTS

WO WO-2021072221 A1 * 4/2021

*Primary Examiner* — Dave Misir
(74) *Attorney, Agent, or Firm* — Pillsbury Winthrop Shaw Pittman, LLP

(57) ABSTRACT

Some embodiments include a process, including obtaining, with a classical computer system, a mathematical problem to be solved by a quantum computing system, wherein: the quantum computing system comprises one or more quantum computers, the mathematical problem involves more variables than any of the one or more quantum computers have logical qubits, and solving the mathematical problem entails determining values of the variables; decomposing, with the classical computer system, the mathematical problem into a plurality of sub-problems, wherein decomposing the mathematical problem into the plurality of sub-problems comprises decomposing the mathematical problem with machine learning into quantum circuits; causing, with the classical computer system, the quantum computing system to solve each of the sub-problems and aggregate solutions to the sub-problems to determine a solution to the mathematical problem; and storing, with the classical computer system, the solution to the mathematical problem in memory.

22 Claims, 11 Drawing Sheets

(56) References Cited

U.S. PATENT DOCUMENTS

| | | | |
|---|---|---|---|
| 2017/0357539 A1* | 12/2017 | Dadashikelayeh | G06N 3/006 |
| 2019/0080255 A1* | 3/2019 | Allen | G06N 10/00 |
| 2020/0104740 A1* | 4/2020 | Cao | G06N 5/003 |
| 2020/0110789 A1* | 4/2020 | Robert | G06N 5/003 |
| 2020/0327441 A1* | 10/2020 | Cao | G06N 10/00 |
| 2021/0133618 A1* | 5/2021 | Cao | G06F 17/11 |
| 2021/0374611 A1* | 12/2021 | Ronagh | G06N 10/60 |
| 2021/0383267 A1* | 12/2021 | Horii | G06N 10/00 |

\* cited by examiner

400

MACHINE LEARNING MAPPING FOR QUANTUM PROCESSING UNITS

CROSS-REFERENCE TO RELATED APPLICATIONS

This application is a continuation of U.S. Non-Provisional patent application Ser. No. 17/560,816, issued as U.S. Pat. No. 11,436,519, titled "MACHINE LEARNING MAPPING FOR QUANTUM PROCESSING UNITS." The entire content of each afore-mentioned patent filing is hereby incorporated by reference.

BACKGROUND

1. Field

The present disclosure relates generally to quantum computing and, in particular, solving problems when the number of variables is greater than the number of qubits.

2. Description of the Related Art

In recent years, the applications of and research into quantum computing have grown exponentially. Quantum computers are expected to become capable of performing computations faster than classical computers for certain classes of problems. Quantum computers are also expected to become capable of solving certain problems that classical computers cannot feasibly solve.

A difference between classical computers and quantum computers relates to how each performs calculations. The results of logical operations performed using a classical computer generally have a definite state, which is represented by a bit that can be in either a first state (e.g., logical "0") or a second state (e.g., logical "1"). On the other hand, quantum computers perform operations using a quantum state of a device, referred to as a "qubit." The state of the qubit prior to measurement is a superposition of all possible states, (e.g., a superposition of the first state and the second state). Only upon measuring the value of the qubit does the superposition state decohere to the final state.

SUMMARY

The following is a non-exhaustive listing of some aspects of the present techniques. These and other aspects are described in the following disclosure.

Some aspects relate to a hybrid computing system including: a quantum computing system, classical memory, and a classical computing system. The quantum computing system may include one or more quantum processing units each capable of executing at least one quantum circuit, where each quantum circuit may include a set of qubits, and each qubit is associated with a quantum operation defined by a quantum parameter. The classical memory may store computer program instructions. The classical computing system may include one or more classical processors configured to execute the computer program instructions to effectuate operations. The operations may include: identifying an objective function having a plurality of variables, wherein the plurality of variables comprises at least a first variable and a second variable; (i) selecting an initial state for the first variable and the second variable; (ii) obtaining, from the quantum computing system, and based on the initial state for the first variable and the second variable, a first output state for the first variable and a second output state for the second variable; (iii) computing a first value of the objective function based on the first output state and the second output state; (iv) adjusting the quantum parameter for each qubit of the set of qubits based on the first value; and repeating steps (i)-(iv) a number of times to obtain a set of values for the objective function and a set of adjustments to the quantum parameter for each qubit of the set of qubits; providing the set of values and the set of adjustments to a neural network to obtain an adjustment value for the quantum parameter associated with each qubit of the set of qubits; and sending instructions to the quantum computing system to cause the quantum parameter associated with each qubit of the set of qubits to be adjusted to a corresponding adjustment value associated with each quantum parameter.

Some aspects include a process, including: obtaining, with a classical computer system, a mathematical problem to be solved by a quantum computing system, wherein: the quantum computing system comprises one or more quantum computers, and the mathematical problem involves more variables than any of the one or more quantum computers have logical qubits; decomposing, with the classical computer system, the mathematical problem into a plurality of sub-problems, wherein decomposing the mathematical problem into the plurality of sub-problems comprises decomposing the mathematical problem with machine learning into quantum circuits; causing, with the classical computer system, the quantum computing system to solve each of the sub-problems and aggregate solutions to the sub-problems to determine a solution to the mathematical problem; and storing, with the classical computer system, the solution to the mathematical problem in memory.

Some aspects include a process, including: obtaining, with a computer system, a first set of raw outputs from a first plurality of shots run by a quantum processor processing a first part of a problem; obtaining, with the computer system, a second set of raw outputs from a second plurality of shots run by the quantum processor or another quantum processor processing a second part of the problem; statistically aggregating, with the computer system, the first set of raw outputs and the second set of raw outputs to determine an expectation value solving or approximating a solution to the problem; and storing, with the computer system, the expectation value in memory Some aspects include a tangible, non-transitory, machine-readable medium storing instructions that when executed by a data processing apparatus cause the data processing apparatus to perform operations including the above-mentioned operations.

Some aspects include a method that, when executed by one or more classical processors, cause the classical processors to perform operations including the above-mentioned operations.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
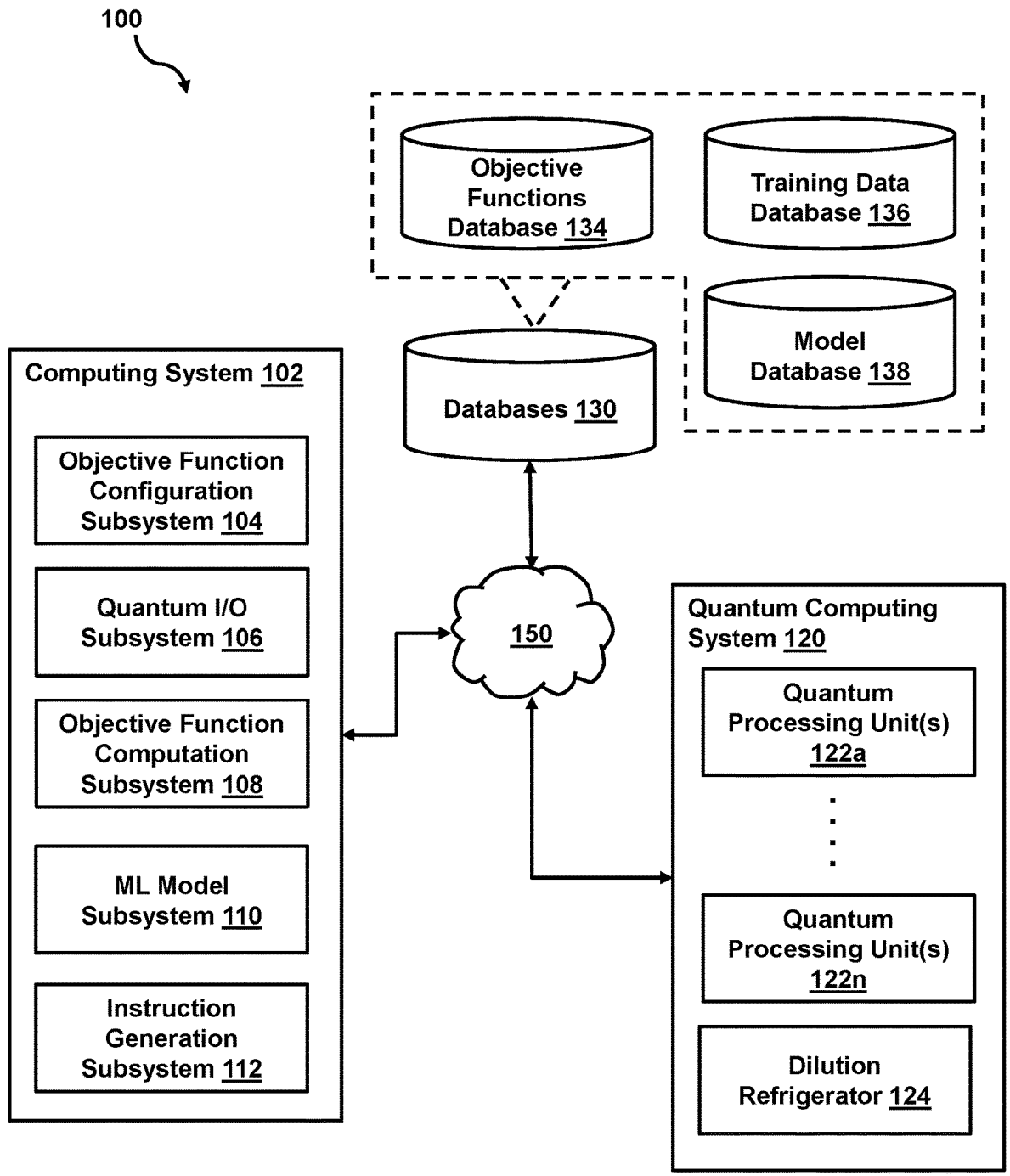
FIG. 1 is a system diagram that illustrates an example of a system for performing machine learning mapping for quantum processing units, in accordance with some embodiments, which should be emphasized encompasses both systems with and without dilution refrigerators.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computer science and quantum computing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Scaling the number of qubits while preventing the decoherence of the quantum state is a challenging endeavor. While tremendous technical advances have been and continue to be made to increase coherence times, preventing decoherence of the superposition state is challenging, particularly because qubits can interact with each other and noisy environments. Generally, the more qubits a quantum computer has, the more difficult it is to preserve the superposition state. While tremendous technical advances have been made to increase the number of qubits a quantum computer has, this number is still less than the number of variables of many commercially relevant objective functions for which use of a quantum computer is desirable. Thus, techniques for solving problems having more variables than available qubits are needed.

Some embodiments mitigate some of the above-described problems and other problems that will be self-evident to one of ordinary skill in the art by transforming a mathematical problem to be solved (which includes optimization problems, like determining a local or global optimum, such as a minimum or maximum) by a quantum computer to a set of sub-problems that are capable of being handled by the quantum computer. In particular, some embodiments solve a problem having a larger number of variables (e.g., more unknown variables than there are qubits) using a quantum computer having a smaller number of qubits. For instance, if N represents a number of variables in the objective function to be solved, and M represents a number of qubits included by the quantum computer, N>M or N>>M. As an example, an objective function describing a problem to be solved by the quantum computer may include 1,000,000 or more variables, whereas the quantum computer may include 1,000 or fewer qubits. Additionally, some or all of the qubits may be sparsely connected. In some cases, the qubits are logical qubits composed of a plurality of physical qubits, e.g., connected in an error-correcting topology (e.g., implementing surface codes or the like), or in some cases, the qubits are individual physical qubits implemented without error correction.

Commercially relevant problems to be solved by quantum computers include objective functions, which in many real-world applications, are too big to be solved by a single quantum computer because the number of variables in the objective function far exceeds the number of qubits of the quantum computer. Some approaches include determining an estimated objective function that approximates the results of the original objective function, but which can be processed by the quantum computer. For example, if the original objective function included a million variables and the quantum computer only a thousand qubits, the estimated objective function would be a form of the objective function that only includes a thousand of the million variables and whose solution reasonably approximates the results of the original objective function. While these approaches work to a degree, they are unable to identify a closed-form exact solution to the objective function. (Which is not to suggest that use of estimated or otherwise approximated objective functions, or any other subject matter, is disclaimed, e.g., even more complex objective functions may be approximated down to the larger-space of problems certain embodiments are configured to process than traditional approaches.)

In some embodiments, the original problem to be solved may be decomposed into a set of sub-problems, and each sub-problem may be sent to a different quantum computer (e.g., of a quantum computing system) to be executed (or they may be sent serially to the same quantum computer, at different times, or both approaches may be combined). The problem $P(x_i)$ may include a plurality of variables (e.g., unknown variables, values of which are to be determined by solving the problem), $x_i$, where $i=1, 2, \ldots, N$, and each sub-problem includes a subset of the variables. For example, if there are three sub-problems, P1, P2, P3, each including a subset of variables $x_i$, and three quantum computers, Q1, Q2, Q3, sub-problem P1 may be sent to quantum computer Q1, sub-problem P2 may be sent to quantum computer Q2, and sub-problem P3 may be sent to quantum computer Q3. Quantum computers Q1, Q2, Q3 may execute sub-problems P1, P2, P3, respectively, in parallel or at different times, and the output results, R1, R2, R3, respectively, of each quantum computer may be obtained after execution. In some embodiments, some or all of the sub-problems may be executed on a single quantum computer sequentially. For example, for the same three sub-problems P1, P2, P3 and a single quantum computer Q1, sub-problem P1 may be sent to quantum computer Q1, which outputs results R1. Subsequently, sub-problem P2 may be sent to quantum computer Q1, which outputs results R2, after which sub-problem P3 may be sent to quantum computer Q1, which outputs results R3.

In some cases, a way in which the sub-problems are constructed may be based on the native features and characteristics of the quantum computer. This may include the set of native gates (e.g., rotations and entanglers) and the underlying coupling topology. There are various types of quantum computers that can be used including: (a) a gate model machine, (b) a quantum annealer, and (c) a combination of a gate model machine and a quantum annealer. Example: Each of these types of quantum computers can include different quantum parameters that define how the types of quantum operations to be performed by a given qubit (a term which is used generically and may also include qutrits, qudits, and the like). Examples of quantum computing devices include superconducting quantum computing devices, like-charge qubits, radio frequency superconducting quantum interference devices, phase qubits, and the like. Examples also include electrodynamic ion traps in trapped ion quantum computers and elements in optical quantum computers. The quantum computers may be universal gate quantum computers or more application-specific architectures like quantum annealing quantum computers. Use cases for topological quantum computers are also contemplated.

For example, the quantum parameters (e.g., corresponding to state of qubits) may include angles $\theta_i$ including an angle of a rotation to be applied to a particle (e.g., an electron), entanglements (for a gate model processor) of the qubits, and a strength of a coupling between qubits (for a quantum-annealing processor, often referred to as coupling strength $J_{ij}$ from Ising-model terminology). In some embodiments, each sub-problem can be processed separately or otherwise independently.

The output results, R1, R2, R3, obtained from each quantum computer or a single quantum computer executing on respective sub-problems P1, P2, P3, may be aggregated to produce a solution to the problem. The output results R1, R2, and R3 represent states of qubits upon measurement, i.e., after the superposition of states has decohered. As an example, a qubit may be initialized to be a first state, such as a spin-up state, in a given quantum computer, which may be configured to perform one or more quantum operations to the qubit. For instance, the particle used to form the qubit may be rotated by an angle $\theta$. After the rotation is applied, the state of the particle can be measured, which determines whether the particle remained in the first state or changed to a second state, such as a spin-down state. Aggregating the output results may include aggregating the measured state of each qubit for a given subset of variables. In some embodiments, aggregating the output results includes concatenating the measured states to obtain a string of values, where each value of the string of variables corresponds to one of the variables of the problem to be solved. The values for each variable can then be input to the problem to compute the expectation value of the problem.

In some embodiments, an adjustment can be made to each quantum parameter based on the expectation value. For example, based on the expectation value obtained, an adjustment to an angle of rotation $\theta$ applied to each qubit of each quantum computer can be made. The adjustment to the angle, e.g., a difference $\Delta\theta$ between a "final" angle $\theta_f$ and an initial angle $\theta_i$, can be stored in memory with the expectation value used to perform the adjustment. For example, a tuple including the adjustment to the angle $\Delta\theta$ and the expectation value Q, T($\Delta\theta$, Q), can be stored in classical (non-quantum) memory. After the quantum parameter has been adjusted, the qubits may be initialized again and sent to the quantum computers, and the process repeated. In some embodiments, the process of initializing a state of each qubit, executing the quantum operations to the initialized qubits, obtaining the output states, aggregating the output states, computing an expectation, adjusting a quantum parameter associated with the quantum operations, and storing a tuple of the adjustment to the quantum parameter and the expectation value, can be repeated a predefined or dynamically configurable number of times, e.g., until a change in an objective function between consecutive iterations is less than a threshold, indicating a local minimum or maximum. In some cases, adjustment may be made according to an optimization algorithm, like stochastic gradient descent. In some embodiments, a partial derivative of initial state values with respect to the objective function is determined, and between iterations, the initial state values may be adjusted in directions and by amounts that the partial derivatives (e.g., approximations thereof or actual values) indicate tend to locally optimize the objective function.

Some embodiments include retrieving the stored tuples, which include a set of adjustments made to the quantum parameters and a corresponding set of expectation values associated with those adjustments, and providing the tuples to a machine learning model. In some cases, the quantum parameters are real number values of quantum circuits, like angles of rotation, strengths of entanglement, and the like. The machine learning model may be configured to determine an optimal adjustment to each quantum parameter based on the set of adjustments and the set of expectation values. In some embodiments, the machine learning model may learn, with unsupervised or partially supervised learning, to configure quantum parameters such that a problem or sub-problem is solved by the quantum computer. In some cases, such learning may be implemented by empirically optimizing the quantum parameters according to an objective function with numerical methods rather than analytical methods. In some cases, the quantum parameters may be optimized without having accesses to a closed form, differentiable objective function, and in some cases, the objective function may be non-differentiable. In some cases, quantum parameters may be determined learned without calculating a partial derivative of the quantum parameter with respect to the objective function in closed form. It should be emphasized that "optimizing" as the term is used herein does not require identifying a global optimum and may include adjusting so as to be proximate or closer to a global or local optima in model parameter space.

In some embodiments, the machine learning model may be a neural network, such as one trained using stochastic gradient descent, examples of such neural networks including a long short-term memory model, or other neural network, or combination of neural networks. Some embodiments may implement adjustments with other types of machine learning models, like reinforcement learning models and decision trees, like random forests thereof, or ensembles of different classes of models. In response to obtaining the optimal adjustment values for each quantum parameter, instructions may be generated to cause a given quantum computer or set of quantum computers to perform the adjustments to the corresponding quantum parameters. The quantum computers may then be provided with the instructions so that the adjustments may be applied. In some embodiments, the objective function (e.g., a cost (or loss) function or a fitness function) used to train the machine learning model is the cost function of a problem to be solved by the quantum computer, thus the problem may be solved by training the model, e.g., the solution string may be the most probable sample among a set of samples generated when empirically determining expectation values (like measures of central tendency, such as mean values, in a plurality of repetitions of the quantum circuits) produced by implementing sets of quantum parameters. Adjustments to quantum parameters between iterations may be based on empirically estimated partial derivatives of quantum parameters with respect to expectation values determined with techniques like parameter-shift and ancilla circuits, where the adjustments tend to optimize the quantum parameters in directions indicated as being locally more optimal by the partial derivatives.

FIG. 1 is a system diagram that illustrates an example of a system 100 for performing machine learning mapping for quantum processing units, in accordance with one or more embodiments. System 100 may include a computing system 102, databases 130, a quantum computing system 120, or other components, each of which being able to communicate with one another via network 150. In some embodiments, computing system 102 is referred to herein interchangeably as a "classical computing system," which may include one or more classical computers, so as to differentiate from quantum computing system 120. Computing system 102 may include an objective function configuration subsystem 104, a quantum I/O subsystem 106, an objective function computation subsystem 108, a machine learning (ML) model subsystem 110, an instruction generation subsystem 112, or other components. An example computing system is described in greater detail below with respect to FIG. 6. It should be noted that while one or more operations are described herein as being performed by particular components of computing system 102, those operations may, in some embodiments, be performed by other components of computing system 102 or other components of system 100. As an example, while one or more operations are described herein as being performed by components of computing system 102, those operations may, in some embodiments, be performed by components of a client device or quantum computing system 120. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, objective function configuration subsystem 104 may be configured to identify an objective function to be solved by quantum computing system 120. Quantum computing system 120 refers to a quantum computer and its associated hardware and electronics. The present techniques are not limited to specific types of quantum computers, as quantum annealers, a quantum gate model machine, other types of quantum computers, or combinations thereof, can be implemented as quantum computing system 120. The objective function may be a mathematical expression of an optimization problem that is to be solved by a quantum computer. In some cases, quantum computers are employed to solve optimization problems that classical computing systems either cannot compute or cannot compute in a feasible amount of time. An example optimization problem is route optimization (e.g., ORION) for identifying the most efficient routes for a delivery service including a fleet of delivery vehicles. Another example involves using quantum computers for cybersecurity and cryptography. Still further examples include other logistic optimization problems, such as air traffic control, and simulating the interactions of electrons in materials. In general, suitable problems may include any constrained discrete optimization problem.

The objective function to be solved (e.g., determining variable values that minimize or maximize, locally or globally, the objective function) may be stored in objective function database 134. A request from a client may include an indication of the objective function to be solved by quantum computing system 120 and, upon receipt of the request, computing system 102 may retrieve the objective function, or data representing the objective function, from objective function database 134.

In some embodiments, objective function configuration subsystem 104 is configured to determine a number of variables included in the objective function to be solved. As an example, consider an example objective function:

$$Q(x_0, x_1, x_2, x_3) = -x_0 \cdot x_1 + x_0 \cdot x_2 - x_1 \cdot x_3$$

Objective function configuration subsystem 104 may identify that this objective function, Q, includes four variables: $x_0$, $x_1$, $x_2$, $x_3$. In some embodiments, objective function configuration subsystem 104 is configured to determine a number of qubits that quantum computing system 120 includes. Based on the number of qubits, objective function configuration subsystem 104 may be configured to determine how to decompose the objective function into a set of subproblems, where each subproblem includes a subset of variables from the objective function. For example, if quantum computing system 120 included two qubits, objective function configuration subsystem 104 may form two sets of variables for objective function Q, such as a first set of variables $\{x_0, x_1\}$ and a second set of variables $\{x_2, x_3\}$. In some embodiments, each set of variables may include a same number of variables. However, alternatively, some or all of the sets of variables may include different numbers of variables. For example, if the objective function includes five variables and the quantum computing system includes two qubits, then objective function configuration subsystem 104 may form three sets of variables, two of which include two variables and a third set including a single variable.

In some embodiments, objective function configuration subsystem 104 is configured to select and assign an initial state to each variable. The initial state represents to an initial configuration that the qubit will have as input for the quantum operations performed. For example, the initial state for a variable may be selected as the zero state, which can be denoted in the Dirac notation as |0>. For a particle spin, the zero state can be used to represent the initial state of the qubit being in a "spin up" or "spin down" state, depending on the configurations of the quantum computer. For simplicity in this explanation, the zero state will be used to refer to the qubit initially being in a "spin down" state, but the mapping of semantic state to physical state can be reversed. After the one or more quantum operations are performed to the qubit, such as one or more rotations, couplings, entanglements, etc., the qubit may remain in the zero state or may switch to be in the one state, denoted as |1>. Using the convention of the zero state referring to "spin down," a measurement of the one state indicates that, after the quantum operations are performed to the qubit, the spin of the particle "flips" to now be "spin up." In some embodiments, each variable in a given set of variables may be assigned a same initial state. For example, using the example objective function above, Q, and an example quantum computing system 120 including two qubits, the initial state assigned to each qubit of the first set of variables $\{x_0, x_1\}$ is the zero state, |0>. The second set of variables $\{x_2, x_3\}$ may also be assigned the zero state, |0>, as the initial state, however, alternatively, the initial state of the second set of variables may differ.

Quantum I/O subsystem 106 may be configured to interface with quantum computing system 120 to facilitate execution of a quantum process. For instance, quantum I/O subsystem 106 can provide information to quantum computing system 120 indicating the initial state or states to assign to different qubits, and can also receive information from quantum computing system 120 indicating a measured output state of the different qubits after the one or more quantum operations have been performed.

Quantum computing system 120 may include one or more quantum processing units (QPUs) 122a-122n (which can collectively referred to as "quantum processing units 122" and individually referred to as "quantum processing unit 122"). Each quantum processing unit 122 includes a plurality of qubits and electronics for controlling operation of the qubits, which may include selectively entangling the qubits (which may also include quantum registers) and performing readout. In some embodiments, some or all of the qubits may be interconnected. Additionally, each of QPUs 122 may be the same type of quantum processor or some of QPUs 122 may differ from one another.

QPUs 122 may include one or more different types of quantum processors, such as quantum logic gate-based processors and quantum annealing processors.

The term quantum logic gate processor refers to a quantum circuit operating on a one or more qubits, akin to classical logic gates. With quantum logic gates, basic quantum circuit operations can be combined to create any sequence. Quantum logic gates are composable to effectively run complex algorithms, such as Shor's algorithm or Grover's algorithm. Quantum logic gates are unitary operators that, mathematically, can be represented as square matrices. More specifically, a quantum logic gate, represented by a $2^n \times 2^n$ unitary matrix, operates on n qubits, represented as a $2^n$ unit vector in a $2^n$ complex Hilbert space. As an example, a qubit can be denoted as $$|\psi\rangle = a|0\rangle + b|1\rangle \text{ where } |0\rangle = \begin{bmatrix} 1 \\ 0 \end{bmatrix} \text{ and } |1\rangle = \begin{bmatrix} 0 \\ 1 \end{bmatrix}.$$

In $|\psi\rangle$, a and b are complex coefficients representing a probability that the qubit will be in either the $|0\rangle$ state or the $|1\rangle$. An operator, U, representing a quantum operation to be performed to the qubit, acts on the qubit to produce a resulting state of the qubit. For example, the quantum equivalent of an inverter, or "NOT" gate, is the Pauli-x matrix:

$$\sigma_x = \begin{pmatrix} 0 & 1 \\ 1 & 0 \end{pmatrix}$$

If the inverter operation is applied to the $|0\rangle$ state, the output result is:

$$\sigma_x |0\rangle = \begin{pmatrix} 0 & 1 \\ 1 & 0 \end{pmatrix} \begin{bmatrix} 1 \\ 0 \end{bmatrix} = \begin{bmatrix} 0 \\ 1 \end{bmatrix} = |1\rangle$$

Hence, the NOT operator, in quantum computing, flips the state of the qubit.

The aforementioned example, and similarly other operators, such as the Pauli-y and Pauli-z gates, refer to operations performed to a single qubit. In some embodiments, for two-qubit gates, such as Ising gates, the operators take on a slightly different format. For example, the Ising coupling gate, $R_{xx}$, causes a rotation of an angle θ to be performed to the qubits. The $R_{xx}$ gate is represented as:

$$R_{xx} = \begin{bmatrix} \cos\left(\frac{\theta}{2}\right) & 0 & 0 & -i\sin\left(\frac{\theta}{2}\right) \\ 0 & \cos\left(\frac{\theta}{2}\right) & -i\sin\left(\frac{\theta}{2}\right) & 0 \\ 0 & -i\sin\left(\frac{\theta}{2}\right) & \cos\left(\frac{\theta}{2}\right) & 0 \\ -i\sin\left(\frac{\theta}{2}\right) & 0 & 0 & \cos\left(\frac{\theta}{2}\right) \end{bmatrix}$$

The Ising coupling gates can be implemented in trapped-ion quantum computers, where a charged particle is confined and suspended using EM-fields.

The Universality principle indicates that any quantum operation can be represented using a finite sequence of gates. Therefore, the quantum operations performed to the qubits in the QPU can be represented as a finite set of unitary operators applied to the qubit. Even two or more qubits that can be represented as a single quantum state formed from the Kronecker product of each individual qubit's state vector. However, entangled qubits cannot be represented in this manner. In order to do so, the operator must either be applied to both qubits or, if it is to be applied to a single qubit, the operator needs to be extended such that is capable of acting on both qubits.

Quantum annealing is a form of quantum computing whereby, in some use cases, a global minimum of an objective function over a set of candidate solutions is found. In some cases, the objective function can refer to the potential energy function, where the n variables of the objective function refer to the degrees of freedom of the Hamiltonian. In general, quantum annealing is effective when trying to find a local minima for the Hamiltonian.

Generally speaking, quantum logic gate processors are more effective and flexible when solving complex problems. However, building quantum logic gates is difficult due to the need to maintain coherence of the superposition state long enough to perform all of the quantum operations. Thus, the number of qubits supported may present issues, absent use of some of the present techniques.

There are numerous ways in which a qubit can be implemented. For example, Table 1 below lists some example qubit implementations.

TABLE 1

| Qubit Type | Implementing Particle | Basis State |0> | Basis State |1> |
|---|---|---|---|
| Electron Spin | Electron | Spin Up | Spin Down |
| Superconducting Flux | Josephson Junction | Clockwise current | Counter-clockwise current |
| Nucleus Spin | Nucleus | Spin Up | Spin Down |
| Photon Polarization | Photon | Horizontal Polarization | Vertical Polarization |

Implementing qubits at a macroscopic scale is difficult due to the quantum mechanical properties of qubits. In some cases, quantum computers are implemented in superconductors, which operate at very low temperatures, e.g., cryogenic temperatures. For example, Josephson junctions exploit a quantum mechanical phenomenon where a current flows across a device, called a Josephson junction, in absence of a voltage. The Josephson junction may include at least two weakly coupled superconductors.

Cryogenic devices, such as dilution refrigerator 124, may be used to maintain the superconductors at an appropriate operating temperature, which can be less than 100 mK, though it should be emphasized that embodiments are not limited to superconducting qubits or systems using dilution refrigerators, which is not to suggest that any other description is limiting. Dilution refrigerator 124 is a cryogenic system that uses liquid helium to cool components of the system to cryogenic temperatures. In some cases, dilution refrigerator 124 maintains an operating temperature of as low as 2 mK. Each QPU 122 may be disposed within dilution refrigerator 124 so as to be subjected to the cryogenic temperatures. Various electronics connected to QPUs 122 run from the cryogenic environment facilitated by dilution refrigerator 124 to the external environment, at ambient temperatures, and are configured to obtain measurements of the qubits of each QPU. For example, changes in temperature inside dilution refrigerator 124 can be read out as changes in resistance, which can indicate changes in energy of the sub-atomic particles within QPUs 122 used to form the qubits.

Quantum I/O subsystem 106 may provide instructions to quantum computing system 120 indicating which variables of each set of variables are to be assigned to each QPU 122, as well as the initial state to be assigned to each qubit in each QPU 122. For example, with reference to FIG. 2A, quantum I/O subsystem 106 may indicate that a first set of variables, $\{x_0, x_1\}$, are to be assigned to a first quantum circuit 202a of a first QPU 122a and that a second set of variables, $\{x_2, x_3\}$, are to be assigned to a second quantum circuit 202b of first QPU 122a. Additionally, quantum I/O subsystem 106 may provide instructions to quantum computing system 122 that indicates the initial state to be assigned to the qubit associated with each variable. For example, variable $x_0$ may be assigned to a first qubit of first quantum circuit 202a having an initial state |0>, variable $x_1$ may be assigned to a second qubit of first quantum circuit 202a having an initial state |0>. Variable $x_2$ may be assigned to a first qubit of second quantum circuit 202b having an initial state |0>, and variable $x_3$ may be assigned to a second qubit of second quantum circuit 202b having an initial state |0>.

Figure 2A:
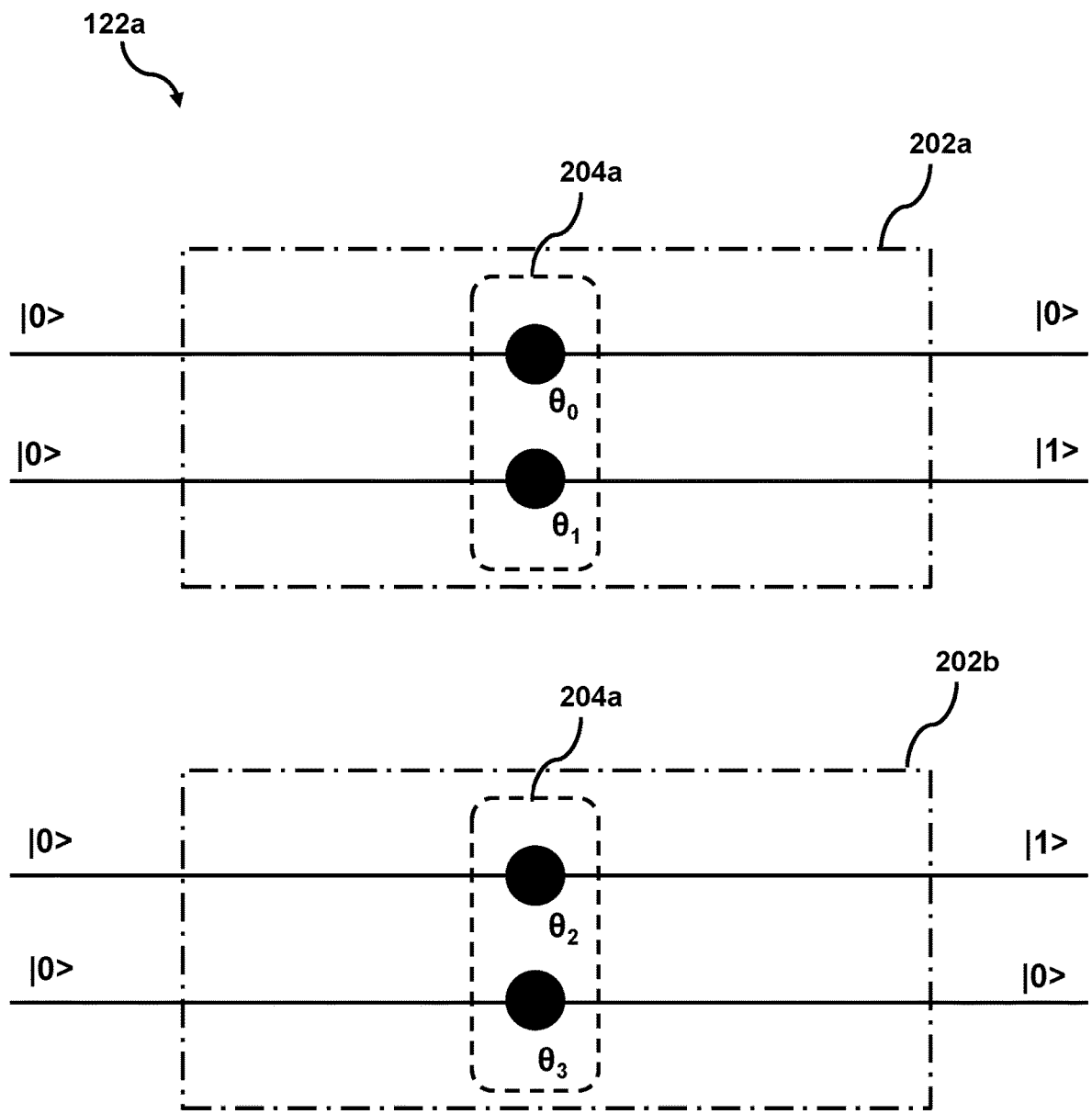
FIGS. 2A-D are circuit diagrams that illustrate example quantum circuits of a quantum processing unit, in accordance with one or more embodiments.

Quantum I/O subsystem 106 may also be configured to cause QPU 122a, as well as, or alternatively, any other QPUs 122, to execute one or more quantum operations to each qubit included within each quantum circuit. In some embodiments, each quantum circuit may cause one or more quantum operations to be performed to a given qubit or set of qubits (e.g., two or more qubits). The quantum operations are similar to "layers" in a neural network—an operation is performed but the layers remain hidden inside the quantum circuit. In the example of FIG. 2A, quantum circuit 202a may include a single rotational layer 204a, whereby a quantum operation, characterized by a quantum parameter $\theta_0$, is performed to a qubit associated with variable $x_0$ and another quantum operation, characterized by a quantum parameter $\theta_1$, is performed to a qubit associated with variable $x_1$. Similarly, quantum circuit 202b may include a single rotational layer 204a, whereby a quantum operation, characterized by a quantum parameter $\theta_2$, is performed to a qubit associated with variable $x_2$ and another quantum operation, characterized by a quantum parameter $\theta_3$, is performed to a qubit associated with variable $x_3$. Each quantum parameter, $\theta_0$, $\theta_1$, $\theta_2$, and $\theta_3$, represents an angle of rotation with which a qubit will be rotated. These angles initially may be unknown, and a goal of the objective function is to determine an amount of rotation (e.g., an angle) to apply to each qubit to produce an optimal solution to the objective function. For example, if the qubit is implemented as an electron, the spin angle of the qubit may be rotated by an angle θ, after which a measurement of the quantum state of the qubit may be made.

Figure 2B:
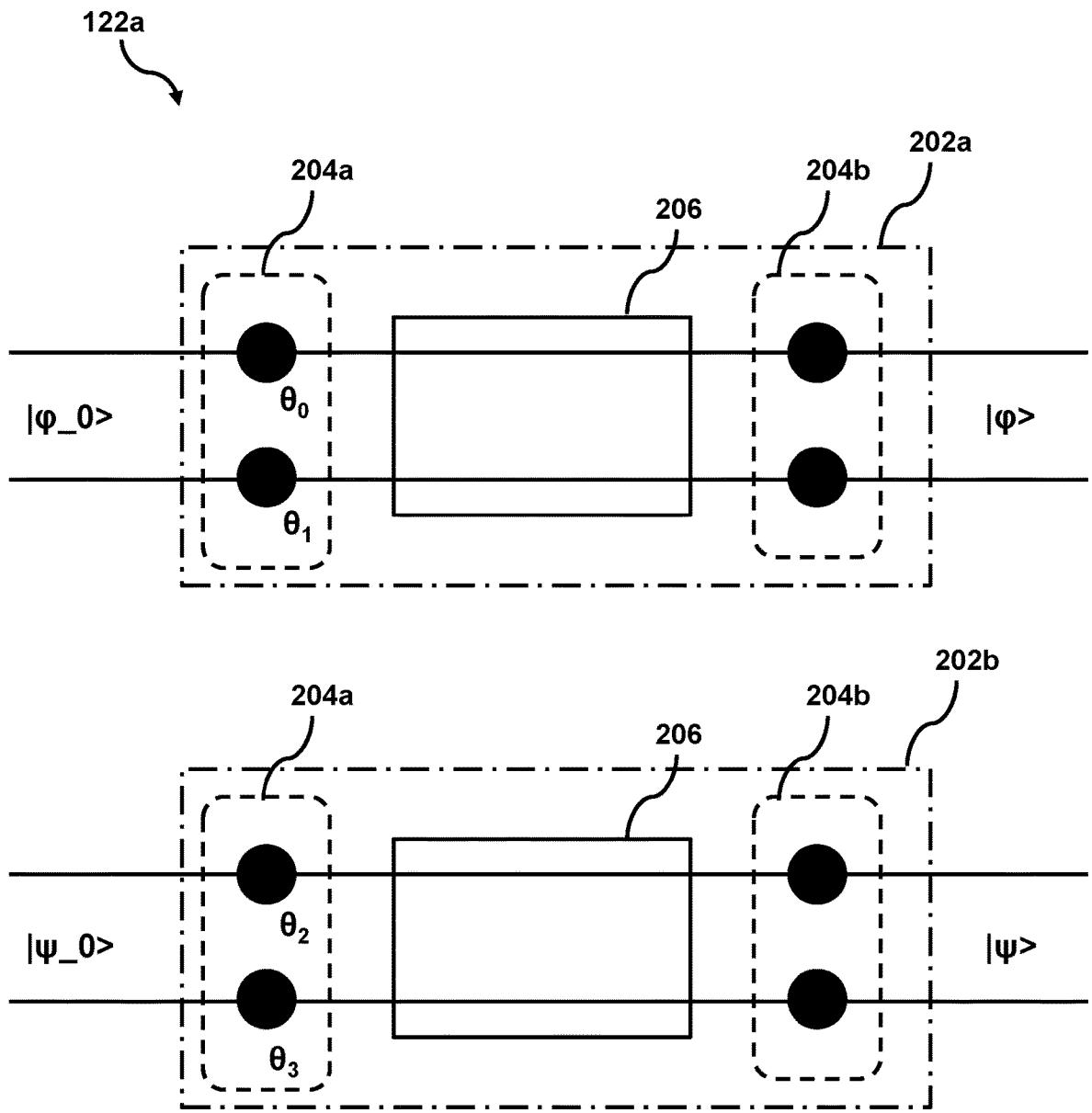
Figure 2C:
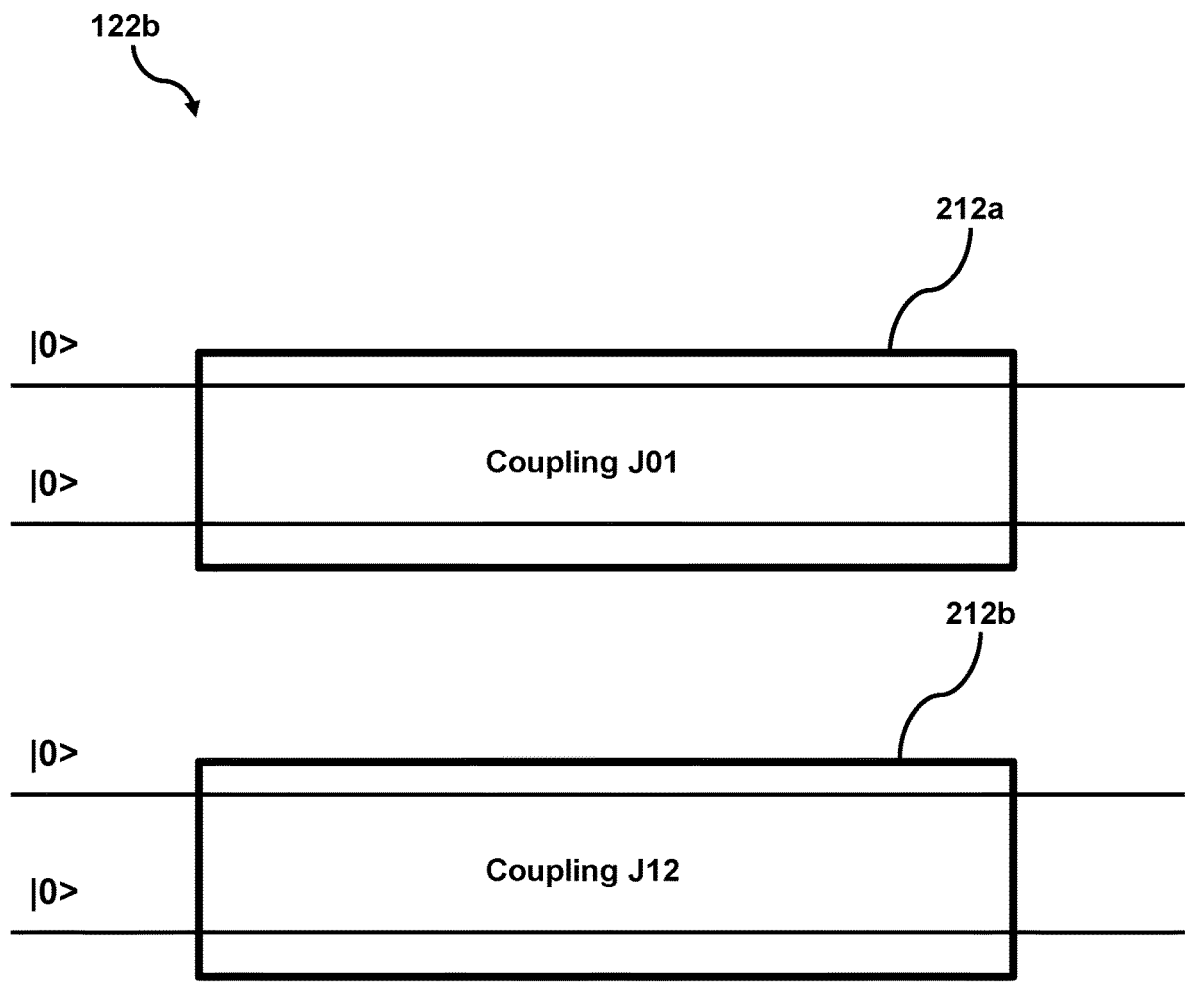
Figure 2D:
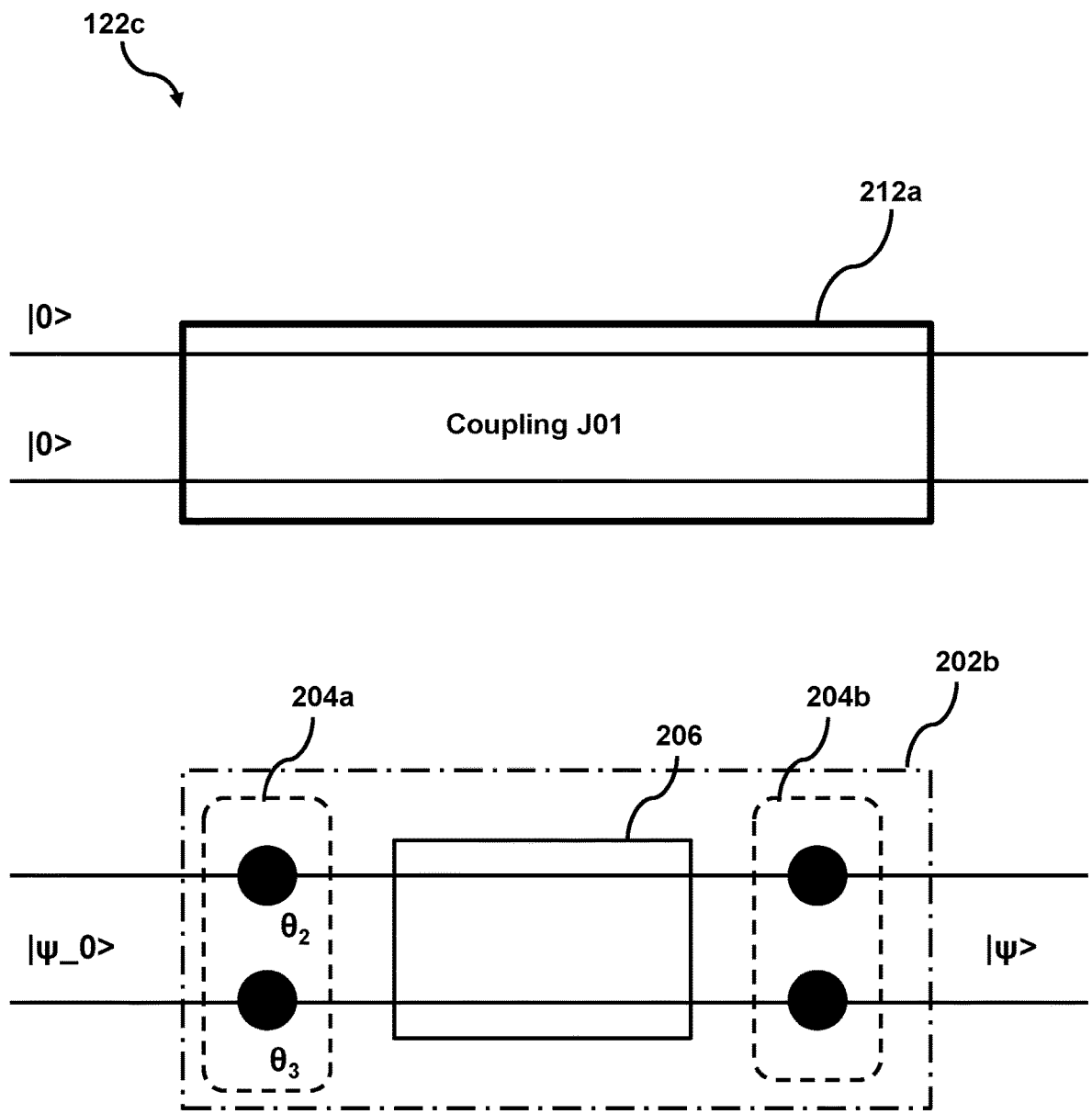

While QPU 122a of FIG. 2A illustrates a simplified example whereby the quantum operation performed to each qubit is a single rotation, additional layers can be added to the quantum circuit in order to solve more complex types of problems. For instance, FIG. 2B includes QPU 122a, which also includes two quantum circuits, first quantum circuit 202a and second quantum circuit 202b, however each quantum circuit 202a, 202b includes additional layers associated with additional quantum operations to be performed to each qubit. For example, quantum circuit 202a includes a first rotational layer 204a, followed by an entanglement layer 206, followed by a second rotational layer 204b. FIG. 2C includes QPU 122b, which includes two machine instructions 212a and 212b, such as, for example, may be processed with quantum annealing systems or gate model systems. Machine instructions 212a and 212b may specify a circuit on circuit-model quantum system, braid twists on topological quantum computers, or an Ising model on a quantum annealing system. Machine instructions 212a and 212b may include a first quantum parameter J01 representing a coupling strength of qubits in quantum circuit 212a and a second quantum parameter J12 representing a coupling strength of qubits in quantum circuit 212b. FIG. 2D is yet another example, where QPU 122c includes an instance of a quantum circuit specified by machine instruction 212a and an instance of quantum circuit 202b, which may be specified by specified by a machine instruction, e.g., by specifying at least some attributes of the quantum circuit 202b. Each QPU 122 can include any number of quantum circuits (e.g., 1 or more, 2 or more, 4 or more, etc.) or Ising models, and each quantum circuit can include any number of qubits (e.g., 2 or more qubits, 4 or more qubits, 16 or more qubits, 64 or more qubits, 128 or more qubits, etc.). Qutrits and other higher-level quantum systems should be understood to embody collections of qubits as that term is used herein, such that a system with qutrits necessarily include qubits and claim elements reciting qubits can be satisfied by qutrits or other higher-level quantum systems.

Returning to the example of FIG. 2A, after executing the quantum operations of rotational layer 204a, quantum circuit 202a outputs a state |0> and a state |1>, and quantum circuit 202b outputs a state |1> and |0>. In other words, after a rotation of angle $\theta_0$ is performed to a qubit associated with first variable $x_0$, having an initial state |0>, the state of the qubit remains in the state |0>. Similarly, after a rotation of angle $\theta_3$ is performed to a qubit associated with third variable $x_3$, having an initial state |0>, the state of the qubit remains in the state |0>. On the other hand, after a rotation of angle $\theta_1$ is performed to a qubit associated with variable $x_1$, and a rotation of angle $\theta_2$ is performed to a qubit associated with variable $x_2$, each having an initial state |0>, the state of each qubit flips from the initial state |0> to the state |1>. Quantum computing system 120 may provide data to computing system 102 indicating the output states of each qubit, as well as metadata indicating a variable associated with each qubit and an initial state of that qubit. For example, the data may be structured as a tuple formatted to indicate (i) a variable mapped to a given qubit, (ii) an initial state of the qubit, (iii) an output state of the qubit after the quantum operation is performed to the qubit, or other information.

In some embodiments, objective function computation subsystem 108 may be configured to receive the data from quantum computing system 120. In response to receiving the data, objective function computation subsystem 108 may be configured to aggregate the output states together to obtain an output string of values of each qubit's measured state value. In some embodiments, aggregating the output states may include concatenating the output steps to obtain a value for each qubit. Concatenating the output state refers to computing a tensor product of the output states. For example, the output states of QPU 122a of FIG. 2A are samples of the form $|0\rangle$; $|1\rangle$; $|1\rangle$; $|0\rangle$. Therefore, computing the tensor product of these states yields an output string $\{0, 1, 1, 0\}$, where the first value, 0, is a value of variable $x_0$, the second value, 1, is a value of variable $x_1$, the third value, 1, is a value of variable $x_2$, and the fourth value, 0, is a value of variable $x_3$. In other words, the initial "guess" for each of variables $x_0$, $x_1$, $x_2$, $x_3$, is $x_0=0$; $x_1=1$; $x_2=1$; and $x_3=0$.

In some embodiments, objective function computation subsystem 108 is configured to take the values for each variable and compute a value for the objective function based on the values of each variable. Continuing the aforementioned example, plugging in the values $x_0=0$; $x_1=1$; $x_2=1$; and $x_3=0$ into the objective function Q produces Q=0 (e.g., $<Q>=0$). It should be noted that Q=0 is not a minimum value of Q, and therefore objective function computation subsystem 108 can adjust some or all of the quantum parameters, e.g., $\theta_0$, $\theta_1$, $\theta_2$, $\theta_3$, and recompute Q based on those new values. For example, each of $\theta_0$, $\theta_1$, $\theta_2$, $\theta_3$ may be adjusted by an amount $\delta\theta_i$, where i=0, 1, 2, 3. In some cases, $\delta\theta_i$ may be the same for each of $\theta_0$, $\theta_1$, $\theta_2$, $\theta_3$, e.g., $\delta\theta_0=\delta\theta_1=\delta\theta_2=\delta\theta_3$, however, alternatively, some or all of the adjustments may differ, e.g., $\delta\theta_i \neq \delta\theta_j$. In some embodiments, the particular value of the adjustment made to each quantum parameter may be determined based on the value of the computed objective function. For example, if a difference between an expected minimum of the objective function and a computed expectation value (e.g., $<Q>$) is large, then the value of the adjustment or adjustments to some or all of the quantum parameters may also be large. Conversely, a small difference between the expected minimum of the objective function and the computed expectation value may indicate that a small adjustment to some or all of the quantum parameters is to be employed. Furthermore, in some embodiments, a machine learning model may be trained to determine an adjustment amount for a given quantum parameter based on the computed expectation value of the objective function, as described in greater detail below with reference to FIG. 4.

In some embodiments, computing system 102 may store the computed value for the objective function with a value of an adjustment made to some or all of the angles. For instance, in response to the first computation of Q, which may be labeled $Q_1$, computing system 102 may generate data including $Q_1$ and the adjustments made to each quantum parameter. As an example, first data $D_1$ may be generated, where $D_1=\{Q_1, \delta\theta_0, \delta\theta_1, \delta\theta_2, \delta\theta_3\}$. Computing system 102 may provide first data $D_1$ to training data database 136 for storage.

In some embodiments, after adjusting each quantum parameter, computing system 102 may be configured to assign an initial state to each qubit, cause quantum computing system 120 to execute the quantum operations to each qubit, and receive the output states for each qubit. Computing system 102 may then aggregate the output states to generate a new output string of values for the variables, and compute an expectation value for the objective function based on the output string. In response to computing the expectation value for the objective function, computing system 102 may again cause each quantum parameter to be adjusted by a certain amount, and the steps of assigning the initial state, executing the quantum operations, obtaining the output states, aggregating the output state, computing the expectation value for the objective function, and causing the quantum parameters to be adjusted may be repeated. In some embodiments, the aforementioned steps may repeated a predefined number of times, e.g., 10 or more times, 100 or more times, 1,000 or more times, or more. In some embodiments, the number of times that the aforementioned steps are repeated is dynamically configurable. For example, the number of iterations of the steps may be modified based on the adjustments being made to the quantum parameters. If the adjustments to the quantum parameters do not change by more than a threshold amount for a certain number of iterations, or if a threshold count of iterations is exceeded, then this may indicate that the iterations may stop, in some embodiments.

Figure 3:
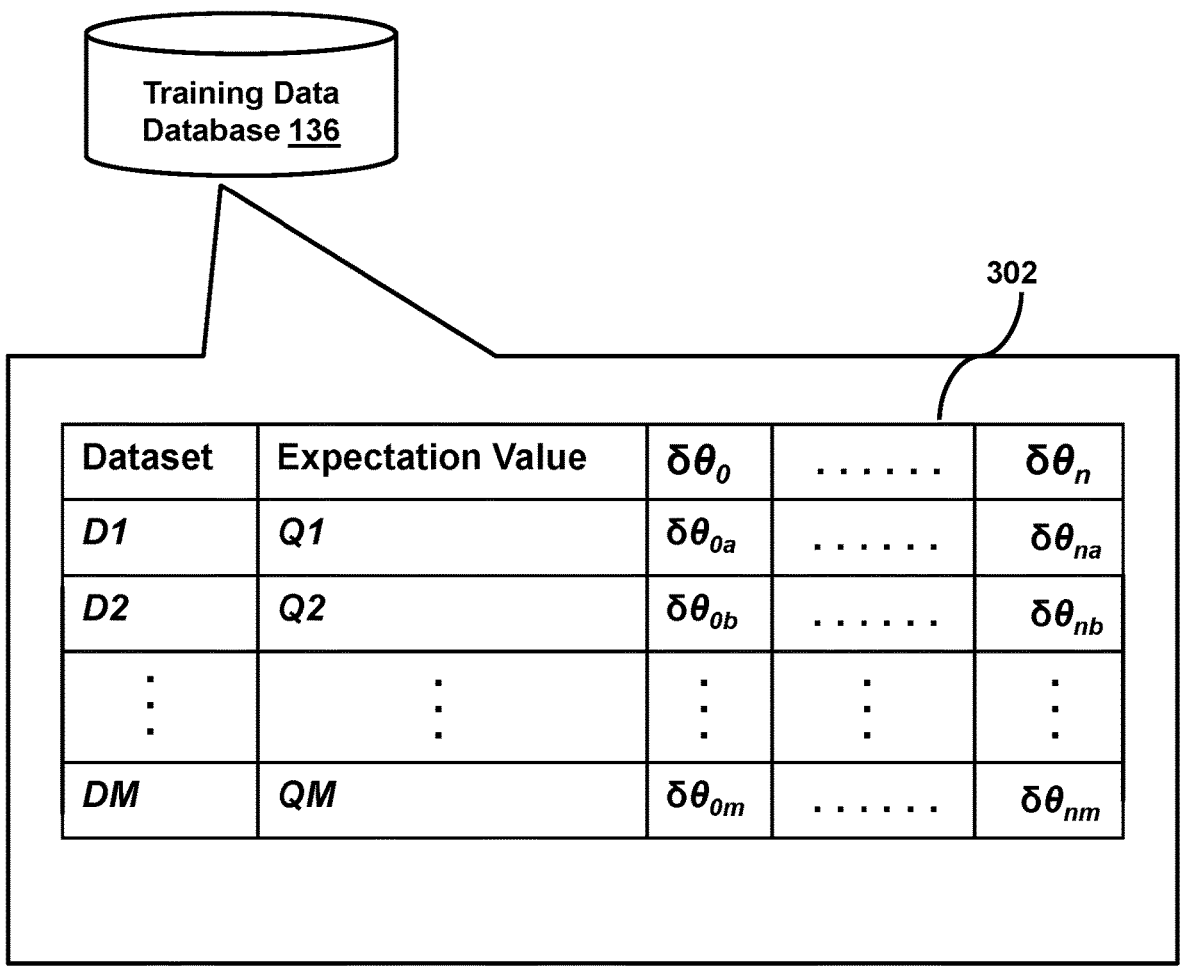
FIG. 3 is a diagram that illustrates an example data structure stored in a database, in accordance with one or more embodiments.

After the aforementioned steps are repeated some number of times (e.g., more than 2, like more than 50, or 50,000), a set of adjustments to each quantum parameter may be stored in training data database 136. As an example, with reference to FIG. 3, training data database 136 may include data structure 302, which is configured to store data sets $D_1$-$D_M$, where M is a number of iterations performed. Each dataset $D_j$ may include a computed expectation value $Q_j$ for the previously executed quantum parameter values and initial state assignments, and a value of an adjustment made to each quantum parameter. In the example of FIG. 3, for simplicity, the quantum parameter refers to an adjustment to an angle of a rotation of the i-th qubit, however additional or alternative quantum parameters may be included. For example, adjustments to a coupling strength of two or more qubits, adjustments made to additional angles of rotation, and the like, may be included in data structure 302.

Returning to FIG. 1, ML model subsystem 110 may be configured to use a machine learning model to compute an optimal value for the adjustments to be made to (which may include computing more optimal versions of) each quantum parameter of each QPU 122. ML model subsystem 110 may obtain a machine learning model from model database 138, which can be used to obtain the optimal value for the adjustments to each quantum parameter. In some embodiments, the machine learning models stored in model database 138 may be trained machine learning models. For example, the machine learning models may be trained using training data, such as training data stored in training data database 136, or other training data, to take one or more inputs and obtain one or more outputs. As an example, ML model subsystem 110 may retrieve a neural network from model database 138. The neural network may be trained to output an optimal adjustment to a quantum parameter, e.g., an adjustment to an angle of rotation for a qubit, based on a set of expectation values for an objective function and a set of adjustments made to the quantum parameter for each expectation value.

In some embodiments, ML model subsystem 110 may obtain data sets $D_1$-$D_M$ stored in training data database 136. ML model subsystem 110 may extract, from data sets $D_1$-$D_M$, a set of expectation values $Q_1$-$Q_M$ and a set of adjustments to some or all of the quantum parameters, e.g., $\delta\theta_{0a}$-$\delta\theta_{0m}$ for quantum parameter $\theta_0$. In some embodiments, the ML model is an unsupervised ML model. In some embodiments, the ML model subsystem 110 may compute a local slope in parameter space (defined by the parameters of the ML model and objective function outputs that correspond) of the ML model with respect to the objective function with numerical methods based on the data sets. For instance, some embodiments may compute, for each quantum parameter, a direction in model parameter space in which the objective function becomes more optimal locally, e.g., over some stride distance that may be relatively small, like less than 10% or less than 1% of a range of the respective quantum parameter. Some embodiments may then adjust the respective quantum parameter in the direction that the respective computed slope indicates is locally more optimal with respect to the objective function. In this manner, some embodiments may perform a gradient descent optimization of the quantum parameters without having access to or using a closed form differentiable objective function, as is commonly otherwise required in many other forms of gradient descent. In some cases, this process may be repeated multiple times until a change in the objective function between iterations is less than a threshold, indicating a local or global maxima or minima. Some embodiments may learn parameters with the Nelder-Mead method, in which step sizes are adjusted based on such a change to drive convergence. Some embodiments may adjust with the conjugate gradient method based on curvature of the objective function locally as estimated with numerical methods to select a next direction of adjustment in parameter space. To guard against the risk of local optima, some embodiments may repeat the training process multiple times with different randomly selected initial values of the quantum parameters, and some embodiments may select the set of quantum parameters from the optimization that produced the most optimal result among the set of candidates. Or some embodiments may use other optimization techniques to adjust the quantum parameters, examples including simulated annealing and evolutionary algorithms and various other forms of numerical optimization.

In some embodiments, quantum parameters may be adjusted with a neural network. The neural network may take, as input, the set of expectation values and the set of adjustments and may output an optimal adjustment to the quantum parameter that will produce a minimum value for the objective function, e.g., Q. In some embodiments, the neural network may compute, in parallel, the optimal adjustment for each quantum parameter. In this scenario, the neural network may take, as input, the set of expectation values, and each set of adjustments, e.g., $\delta\theta_{0a}$-$\delta\theta_{0m}$ for quantum parameter $\theta_0$, $\delta\theta_{1a}$-$\delta\theta_{1m}$ for quantum parameter $\theta_1$, and so on. Alternatively, the neural network may take the set of expectation values and one of the sets of adjustments to a quantum parameter, predict an optimal adjustment for that quantum parameter, and then take the set of expectation values and another one of the sets of adjustments for a different quantum parameter. In some embodiments, the neural network may be trained with back propagation, using gradient descent, and the model may be a deep neural network (DNN), a long short-term memory (LSTM) model, or another type of neural network, or a combination thereof. For instance, ML model subsystem 110 may select one or more machine learning models from model database 138. Model database 138 may store a number of different machine learning models including, but not limited to, (which is not to suggest that other lists are limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAID), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Reinforcement Learning, Graphical Models, or separable convolutions (e.g., depth-separable convolutions, spatial separable convolutions, etc.).

In some embodiments, instead of storing the adjustments made to each quantum parameter, and subsequently computing an optimal adjustment to each quantum parameter, the adjusted quantum parameter may be stored (e.g., in classical memory). For example, instead of storing $\delta\theta_0$ as an adjustment to rotational angle $\theta_0$, the new angle, e.g., $\theta_0 + \delta\theta_0$, may be stored. Therefore, ML model subsystem 110 may provide, to the neural network, as input, the set of expectation values for the objective function and the set or sets of adjusted quantum parameters, and may obtain an optimal quantum parameter or parameters.

Instruction generation subsystem 112 may be configured to generate instructions that cause quantum computing system 120 to adjust one or more quantum parameters associated with quantum operations performed by QPUs 122. The instructions that are generated may include instructions to cause a quantum parameter characterizing a quantum operation that is to be applied to a given qubit to be adjusted by a particular amount determined based on an output of a machine learning model. For example, in response to obtaining an optimal adjustment to an angle of rotation to be applied to a qubit, instruction generation subsystem 112 may generate instructions to cause quantum computing system 120 to effectuate the adjustment to the angle of rotation. This may include increasing or decreasing a voltage or current applied to an electromagnetic component of quantum computing system 120 such that a strength and direction of an electromagnetic field is adjusted in accordance with the desired optimal adjustment. In some embodiments, instruction generation subsystem 112 may provide the instructions to quantum computing system 120 to cause the quantum parameters to be adjusted. After the quantum parameters have been adjusted, quantum computing system 120 is configured to produce an optimal result when used to perform the given computation, as the objective function has not been estimated and all of the variables have been employed in the computations.

Figure 4:
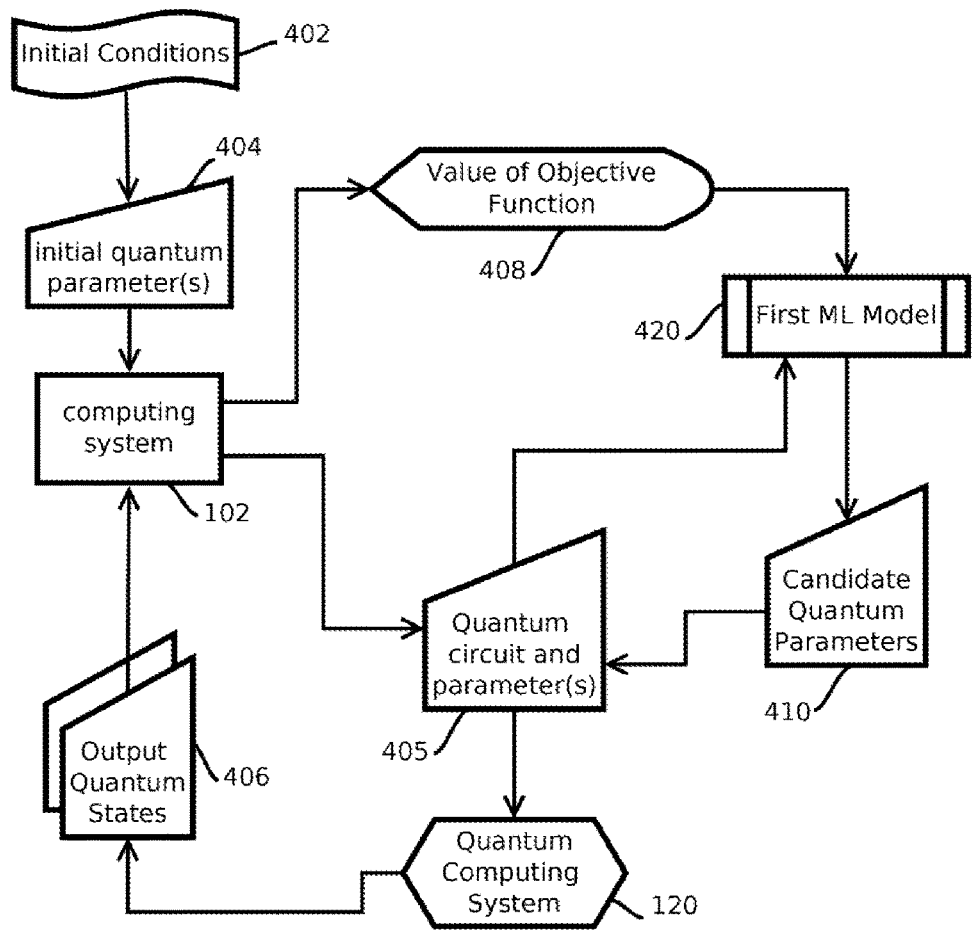
FIG. 4 is a system diagram that illustrates an example of a process for using machine learning models and quantum computing systems to learn a mapping for quantum processing units, in accordance with one or more embodiments.

FIG. 4 is a system diagram that illustrates an example of a process 400 for using machine learning models and quantum computing systems to learn a mapping for quantum processing units, in accordance with one or more embodiments. Process 400 may begin with initial conditions 402, which may include an initial state to be assigned to each qubit, a number of qubits in each QPU 122, an objective function to be analyzed, a number of variables that the objective function includes, or other information. Initial conditions 402 may be provided to computing system 102. Computing system 102 may be configured, as described above, to obtain initial conditions 402 and determine, based on initial conditions 402, determine how to decompose the objective function into a set of sub-problems. Each set of sub-problems may include a set of variables of the plurality of variables that the objective function includes. In some embodiments, computing system 102 may determine the set of sub-problems, and the number of variables to include in the set of variables, based on the number of variables included in the objective function and a number of qubits included in each QPU 122 of quantum computing system 120.

Computing system 102 may further determine or otherwise obtain initial quantum parameters 404, such as the various sets of variables, an initial state to be assigned to each variable's corresponding qubit, or other information. For example, initial parameters 404 may indicate that a first set of qubits included in a quantum circuit of a first QPU 122 of quantum computing system 120 is to be assigned one variable from a first set of variables. In some embodiments, initial conditions 402 and initial quantum parameters 404 may indicate whether each set of variables is to be assigned to a different QPU 122 and the quantum operations executed in parallel, or a same QPU 122 and the quantum operations executed sequentially. Based on initial conditions 402 and initial quantum parameters 404, computing system 102 may facilitate quantum computing system 120 executing the quantum operations with each qubit, obtaining and outputting output quantum states 406. To this end or others, computing system 102 may configure quantum circuits and parameters 405 to be instantiated with quantum computing system 120.

Output quantum states 406 may be used by computing system 102 to compute an expectation value 408 for the objective function. For example, computing system 102 may aggregate the output states of each quantum computing system and use the value computed for each variable from the aggregation to compute the expectation value 408 of the objective function. In some embodiments, expectation value 408, the current parameters 408, and updated candidate parameters 410 may be provided to a first machine learning model 420. First ML model 420 may be configured to take, as input, expectation value 408, the current parameters 408, and the updated candidate parameters 410 and output a candidate quantum parameter 410. Candidate quantum parameter 410 may indicate a new value for a given quantum parameter (e.g., a new rotational angle, a new coupling strength) or an adjustment to be made to a given quantum parameter (e.g., an amount to adjust a current rotational angle, an amount to adjust a current coupling strength).

QPU's are generally probabilistic, so to determine outputs, some embodiments may apply statistical aggregation to raw outputs in a set of repetitions to determine expectation values. Aggregation may take a variety of forms. Some embodiments may run multiple (e.g., several hundred, thousand, or more) shots of a given configuration on a set of QPUs to determine a probability distribution of a result or other output. For instance, a 30 variable problem may be decomposed into three 10-variable sub-problems, each run for 10,000 shots on a different QPU (or the same QPU at different times), with the same inputs applied for each shot. This example workflow produces three sets of 10,000 QPU raw outputs, each raw output having 10 values, one for each of the variables.

A probability distribution of outputs may be determined based on these raw outputs from the three set of shots. Some raw outputs (i.e., 10 variable values computed by the QPU, like a ten-digit binary string) may repeat more than others in the 10,000 raw outputs. Thus, in the example above, there may be one raw output that appears most often among the 10,000 raw outputs, another that appears second most often, and so on. In some cases, this ranking may be determined for each of the three sets of shots, and the results may be concatenated by rank order (e.g., the most common raw outcome from the first set may be concatenated with the most common raw outcome from set two and the most common raw outcome from set three, and similarly for the second most common raw outcome and so on). Or in some cases, the values from the sets of shots may be concatenated by shot number (e.g., the first shot of set one, concatenated with the first shot of set two, and the first shot of set three) and then a ranking (or other characterization of probability distribution) may be determined from the result (e.g., the first, second, third, and so on most common concatenated results may be determined). Some embodiments may filter out raw outcomes or concatenated raw outcomes that are less than a threshold probability or ranking in the probability distribution. Some embodiments may compute an expected value as the aggregate output, e.g., selecting a most common concatenated string of binary values, computing a measure of central tendency (like mean, mode, or median) on those above a threshold probability or rank, or computing a probability weighted measure of central tendency.

The resulting expected value may be used as the output for purposes of the above-described application of numerical methods to adjust quantum parameters according to an objective function. It should be emphasized, though, that use of aggregation is not limited to machine learning related use cases, which is not to suggest that other descriptions are limiting. Aggregation techniques like those described may be used in other tasks where a reducing step is needed.

First ML model 420 may be trained using previous expectation values and the corresponding adjustments made to those quantum parameters or the new quantum parameters. The training data used to train first ML model 420 may be stored in training data database 136, and first ML model 420 may be stored in model database 138. In some embodiments, each new expectation value 408 and candidate quantum parameter 410 may be added to a set of training data for updating or re-training first ML model 420. In some embodiments, candidate quantum parameter 410 may be compared to a determined optimal value for the corresponding quantum parameter, and the comparison may be used to determine reference feedback for first ML model 420 during training.

In some embodiments, candidate quantum parameter 410 may be provided to quantum computing system 120 to cause a given quantum parameter to be adjusted to a new value. After the adjustment to the quantum parameter, or parameters, computing system 102 may cause quantum computing system 120 to execute the quantum operations of each QPU, thereby obtaining new output states 406, which can be used to compute a new expectation value 408 for the objective function. These steps may be repeated a predefined or dynamically adjustable number of times. After each iteration, expectation value 408 and an adjustment made to each quantum parameter, determined based on candidate quantum parameter 410, may be stored. For example, a set of adjusted quantum parameters 412 and a set of values for the objective function 414, e.g., expectation values, may be stored in training data database 136. In some cases, set of adjusted quantum parameters 412 may include an adjustment to be made to each quantum parameter, e.g., an amount an angle of rotation to be applied to a qubit is to change.

In some embodiments, set of adjusted quantum parameters 412 and set of values for the objective function 414 may be provided to a second ML model 430. Second ML model 430, as detailed above, may be trained to determine an optimal adjustment to a given quantum parameter to minimize the objective function. In response to set of adjusted quantum parameters 412, or a set of adjustments made to a quantum parameter, being provided, as input, to second ML model 430, along with set of values of objective function 414, second ML model 430 may output adjust quantum parameter 416. Depending on whether set of adjusted quantum parameters 412 includes each quantum parameter associated with each qubit, and is provided or computed in parallel by second ML model 430, adjusted quantum parameter 416 may be a single adjusted quantum parameter or multiple adjusted quantum parameters. In some cases, adjusted quantum parameter 416 may include an amount of adjustment to be made to a given quantum parameter. For example, instead of, or in addition to, indicating an adjusted value for a given quantum parameter, adjusted quantum parameter 416 may also indicate an amount the given quantum parameter is to be adjusted. As an example, if the new adjusted quantum parameter is $\theta^*$, then adjusted quantum parameter 416 may indicate $\theta^*$ or $\delta\theta^*$, where $\delta\theta^* = \theta^* - \theta$.

Figure 5A:
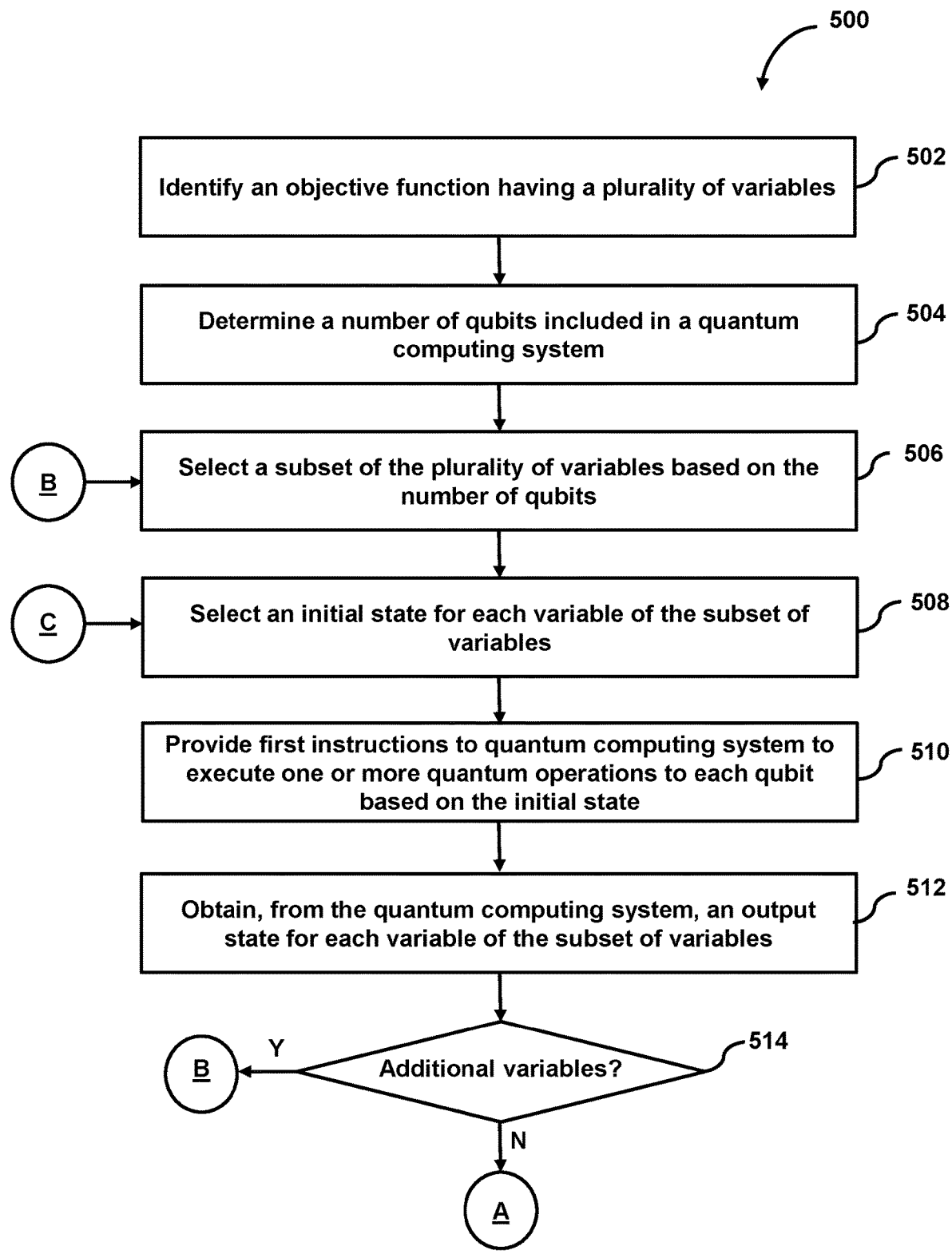
FIGS. 5A-5B are flowcharts that illustrate an example of a process for using machine learning to map variables to qubits, in accordance with one or more embodiments.
Figure 5B:
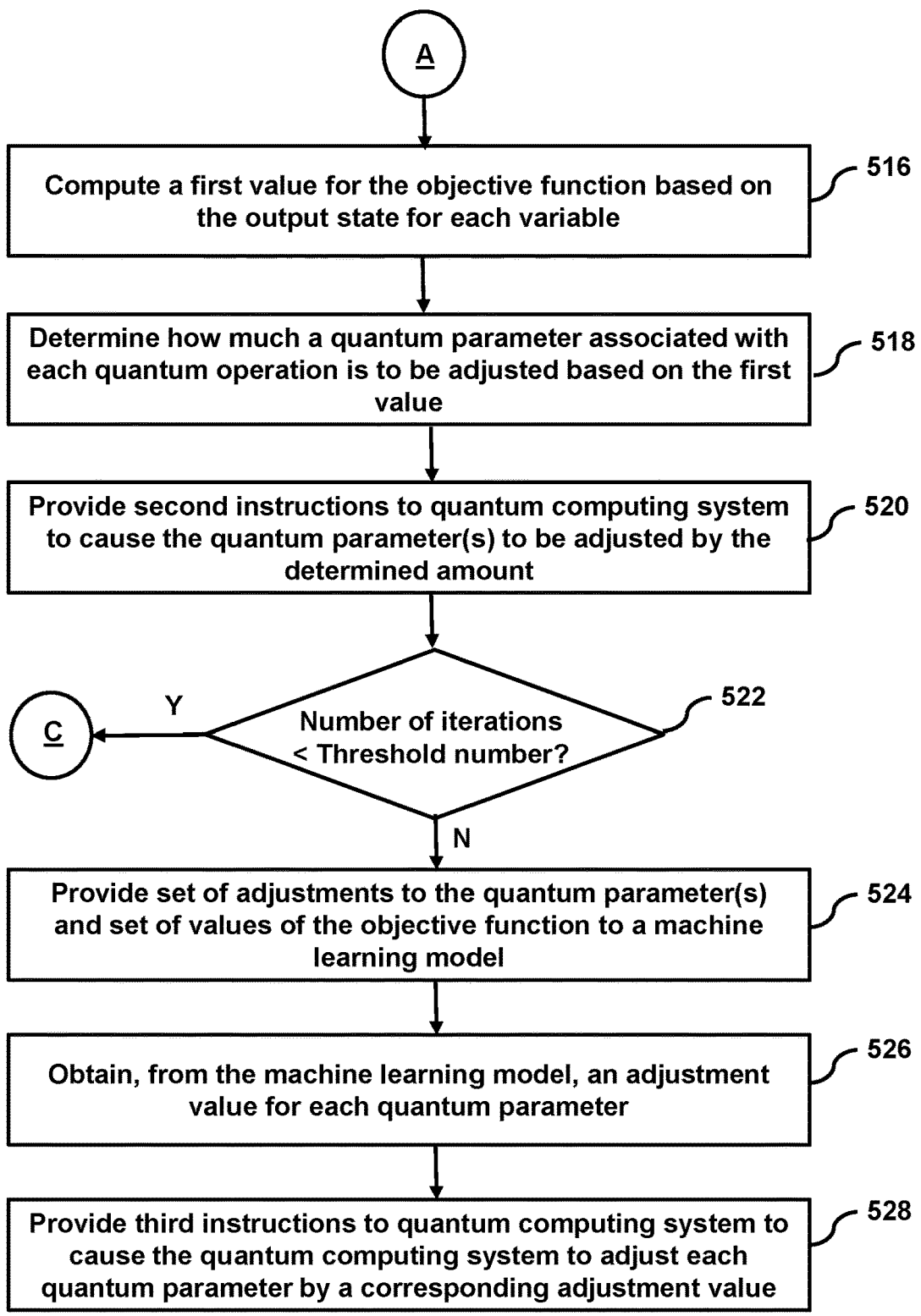

FIGS. 5A-5B are flowcharts that illustrate an example of a process 500 for using machine learning to map variables to qubits, in accordance with one or more embodiments. In some embodiments, process 500 may begin at step 502. At step 502, an objective function having a plurality of variables may be identified. The plurality of variables, which can degrees of freedom, represent independent parameters of the objective function. In some cases, the objective function is to be minimized or maximized, and therefore a value of each variable to produce the minimized or maximized value of the objective function is needed. As mentioned above, the objective function Q is a function of four variables, $x_0$, $x_1$, $x_2$, $x_3$. Therefore, to minimize (or maximize) the objective function Q, a suitable value for each of variables $x_0$, $x_1$, $x_2$, $x_3$ is to be determined. Although the objective function Q includes four variables, in many real-world applications, the number of parameters can be much greater. For example, an objective function may include 1,000 or more variables, 10,000 or more variables, 100,000 or more variables, 1,000,000 or more variables, etc. In some embodiments, step 502 may be performed by a subsystem that is the same or similar to objective function configuration subsystem 104.

At step 504, a number of qubits included in a quantum computing system may be determined. In some embodiments, quantum computing system 120 may include one or more QPUs 122. Each QPU 122 may include one or more quantum circuits formed of two or more qubits. In some embodiments, the number of qubits included in each quantum circuit, as well as cumulatively for quantum computing system 120, is less than the number of variables included in the objective function. For example, quantum computing system 120 may include two or more qubits, four or more qubits, eight or more qubits, sixteen or more qubits, sixty-four or more qubits, one hundred twenty-eight or more qubits, etc. If the objective function includes N variables and quantum computing system 120 includes M variables, N>>M. In some embodiments, step 504 may be performed by a subsystem that is the same or similar to objective function configuration subsystem 104.

At step 506, a subset of the plurality of variables may be selected based on the number of qubits that quantum computing system 120 includes. For instance, the objective function may be decomposed into sets of sub-problems, and each sub-problem includes a set of variables from the plurality of variables. As an illustrative example, objective function Q, which includes four variables, $x_0$, $x_1$, $x_2$, $x_3$, may be decomposed into two sets of variables, e.g., $\{x_0, x_1\}$ and $\{x_2, x_3\}$, if QPU 122 includes two qubits. If QPU 122 included four qubits, then a single set of variables $\{x_0, x_1, x_2, x_3\}$ may be selected. In some embodiments, step 506 may be performed by a subsystem that is the same or similar to objective function configuration subsystem 104.

At step 508, an initial state for each variable of the subset of variables may be selected. In some embodiments, a first subset of variables may be chosen, and the initial state for each variable in the first subset of variables may be selected. The initial state refers to an initial quantum state that a qubit is to be assigned. For example, the initial state may be a state $|0\rangle$ or $|1\rangle$ for single qubit operations, a state $|00\rangle$, $|01\rangle$, $|10\rangle$, or $|11\rangle$ for two-qubit operations, and the like. Each variable in the first subset of variables may be mapped to one of the qubits included in a QPU 122, and the initial state may be assigned to that qubit. For example, if quantum computing system 120 includes a single QPU 122 including two qubits, then a first set of variables, $\{x_0, x_1\}$, may be mapped to the two qubits, e.g., variable $x_0$ mapped to a first qubit and variable $x_1$ mapped to a second qubit. The initial state may depend on a type of quantum computer that quantum computing system 120 corresponds to, e.g., quantum gate model, quantum annealer. In some embodiments, the initial state may be the same for each qubit in quantum computing system 120. For example, the first qubit, associated with variable $x_0$, and the second qubit, associated with the variable $x_1$, may both be assigned to be in a state $|0\rangle$. Alternatively, the initial state for each qubit in quantum computing system 120 may differ. For example, the first qubit, associated with variable $x_0$, may be assigned to be in a state $|0\rangle$, while the second qubit, associated with the variable $x_1$, may be assigned to be in a state $|1\rangle$. In some embodiments, step 508 may be performed by a subsystem that is the same or similar to objective function configuration subsystem 104.

At step 510, first instructions may be provided to quantum computing system 120 to execute one or more quantum operations to each qubit based on the initial state assigned to that qubit. The instructions may indicate that quantum computing system 120 is to cause the quantum operations associated with each qubit to execute. In some embodiments, the quantum operations include causing a particle, used to implement the qubit, to have its spin axis rotated by an angle θ, couple to another qubit, or perform other operations. Each quantum operation may be defined by a quantum parameter, which quantifies a magnitude of the operation being performed. In some embodiments, a given qubit may be subject to multiple operations, such as a rotation by a first angle, an entanglement, and another rotation. In some embodiments, step 510 may be performed by a subsystem that is the same or similar to quantum I/O subsystem 106, instruction generation subsystem 112, or a combination thereof.

At step 512, an output state for each variable of the subset of variables may be obtained from quantum computing system 120. After the quantum operations are performed, a state of the qubit can be measured by quantum computing system 120. For example, the measured state for a first qubit, associated with variable $x_0$, which was initially assigned to be in a state $|0\rangle$, may be measured as being in a state $|0\rangle$, while the second qubit, associated with the variable $x_1$, initially assigned to be in a state $|0\rangle$, may be measured as being in a state $|1\rangle$. Quantum computing system 120 may be configured to generate and send data indicating each measured state, along with the variable with which a given measured state corresponds, to computing system 102. In some embodiments, step 512 may be performed by a subsystem that is the same or similar to quantum I/O subsystem 106.

At step 514, a determination may be made as to whether there are any additional variables that need to be assigned to a qubit and have quantum operations performed thereto. For example, if, initially, the first set of variables $\{x_0, x_1\}$ was assigned to a two-qubit instance of quantum computing system 120, then after the output states are measured for each variable of the first set, the second set of variables, $\{x_2, x_3\}$, may be processed. This may include selecting the second set of variables (step 506), selecting an initial state to assign to each variable of the second set, (step 508), providing instructions to quantum computing system 120 to execute quantum operations to the qubits associated with each variable (step 510), and obtaining the measured output states of those qubits (step 512). Therefore, if, at step 514, it is determined that additional variables need to be executed by quantum computing system 120, then process 500 may proceed to step 506, whereby steps 506-512 may be repeated until no more variables need to be processed. However, if all of the variables have been processed, then process 500 may proceed to step 516. In some embodiments, additional QPUs 122 may be used to process multiple sets of variables. For example, first set of variables $\{x_0, x_1\}$ may be processed using a first QPU 122 including two qubits, and second set of variables $\{x_2, x_3\}$ may be processed using a second QPU 122 also including two qubits. In this example, QPUs 122 may process both sets of variables, e.g., in parallel. Alternatively, if quantum computing system 120 includes a single QPU 122, then each set of variables may be processed sequentially. For example, first set of variables $\{x_0, x_1\}$ may be processed by QPU 122, and, after obtaining the output states for each variable of the first set, the second set of variables $\{x_2, x_3\}$ may be processed by QPU 122. In some embodiments, step 514 may be performed by a subsystem that is the same or similar to quantum I/O subsystem 106.

At step 516, a first value for the objective function may be computed based on the output state of each variable. In some embodiments, the output states of each variable may be aggregated together. Aggregating the output states may include concatenating the vectors of each output state to obtain an output string of values for each variable. For example, samples of the measured output state of each qubit, respectively associated with variables $x_0$, $x_1$, $x_2$, $x_3$, may be $|0\rangle$, $|1\rangle$, $|1\rangle$, $|0\rangle$, and the output string formed by computing the tensor product of the measured output states may be $\{0, 1, 1, 0\}$, where the first value in the input string, 0, is a candidate value for variable $x_0$, the second value in the input string, 1, is a candidate value for variable $x_1$, the third value in the input string, 1, is a candidate value for variable $x_2$, and the fourth value in the input string, 0, is a candidate value for variable $x_3$. In some embodiments, the values for each variable may be used to compute a value for the objective function. For example, based on the aforementioned output string, the first value for the objective function Q is Q=0. In some embodiments, step 516 may be performed by a subsystem that is the same or similar to objective function computation subsystem 108.

At step 518, a determination is made as to how much a quantum parameter associated with each quantum operation is to be adjusted based on the first value computed for the objective function. For instance, based on the first value, a determination may be made that a first quantum parameter, e.g., $\theta_0$, is to be adjusted by a first adjustment amount, $\delta\theta_0$. In some embodiments, a magnitude of each adjustment may be based on the computed value for the objective function. For instance, if the computed value is vastly different than the desired outcome, then the adjustment to some or all of the quantum parameters may be large, however if the computed value is small as compared to the desired outcome, then the adjustment to some or all of the quantum parameters may also be small. In some embodiments, step 518 may be performed by a subsystem that is the same or similar to objective function computation subsystem 108.

At step 520, second instructions may be provided to quantum computing system 120 to cause the quantum parameters to be adjusted by the determined amount. The second instructions may indicate an amount by which some or all of the quantum parameters are to be adjusted prior to executing the quantum operations to the respective qubit. For example, the second instructions may indicate that a first quantum parameter $\theta_0$ is to be adjusted by a first adjustment amount $\delta\theta_0$, a second quantum parameter $\theta_1$ is to be adjusted by a second adjustment amount $\delta\theta_1$, a third quantum parameter $\theta_2$ is to be adjusted by a third adjustment amount $\delta\theta_2$, and a fourth quantum parameter $\theta_3$ is to be adjusted by a fourth adjustment amount $\delta\theta_3$. In some embodiments, some or all of the adjustment amounts may be the same, e.g., $\delta\theta_i = \delta\theta_j$. In some embodiments, step 520 may be performed by a subsystem that is the same or similar to quantum I/O subsystem 106, objective function computation subsystem 108, instruction generation subsystem 112, or a combination thereof.

At step 522, a determination may be made as to whether a number of iterations steps 506-520 is less than a threshold number of iterations. In some embodiments, the threshold number of iterations may be predefined or dynamically configurable. For example, the threshold number of iterations may be 10 iterations or more, 100 iterations or more, 1,000 iterations or more, or other amounts. If, at step 522, it is determined that the number of iterations is less than the threshold number of iterations, then process 500 may return to step 508 where an initial state may be selected for each variable in a first subset of variables, and the process may repeat with the new adjusted quantum parameters. If, however, at step 522, it is determined that the number of iterations is not less than the threshold number of iterations, then process 500 may proceed to step 524. In some embodiments, step 522 may be performed by a subsystem that is the same or similar to objective function computation subsystem 108.

At step 524, the set of adjustments to the quantum parameters and the set of values of the objective function may be provided to a machine learning model. In some embodiments, after an expectation value for the objective function is computed, and the adjustments to the quantum parameters are determined, the values and adjustments may be stored together in a data structure, e.g., data structure 302, in training data database 136. For example, the set of expectation values, e.g., $Q_1, Q_2, \ldots, Q_M$, and one or more sets of adjustment values, e.g., $\delta\theta_{0a}$-$\delta\theta_{0m}$, $\delta\theta_{1a}$-$\delta\theta_{1m}$, ..., $\delta\theta_{na}$-$\delta\theta_{nm}$, may be provided to a neural network. The neural network may be configured to take, as input, a set of expectation values and one or more sets of adjustment values to quantum parameters, and output an optimal adjustment value for each quantum parameter such that the objective function is minimized or maximized. For example, the neural network may be use gradient descent to compute the optimal adjustment values. In some embodiments, step 524 may be performed by a subsystem that is the same or similar to ML model subsystem 110.

At step 526, an adjustment value for each quantum parameter may be obtained from the machine learning model. The adjustment value may represent an optimized adjustment value for each quantum parameter such that the objective function is optimized, e.g., minimized, maximized. In some embodiments, step 526 may be performed by a subsystem that is the same or similar to ML model subsystem 110.

At step 528, third instructions may be provided to quantum computing system 120 to cause quantum computing system 120 to adjust each quantum parameter by a corresponding adjustment value estimated by the machine learning function. In some embodiments, the instructions may indicate how quantum computing system 120 should adjust the configurations of each quantum parameter such that the quantum parameter is the determined optimal value. In some embodiments, step 528 may be performed by a subsystem that is the same or similar to instruction generation subsystem 112.

Figure 6:
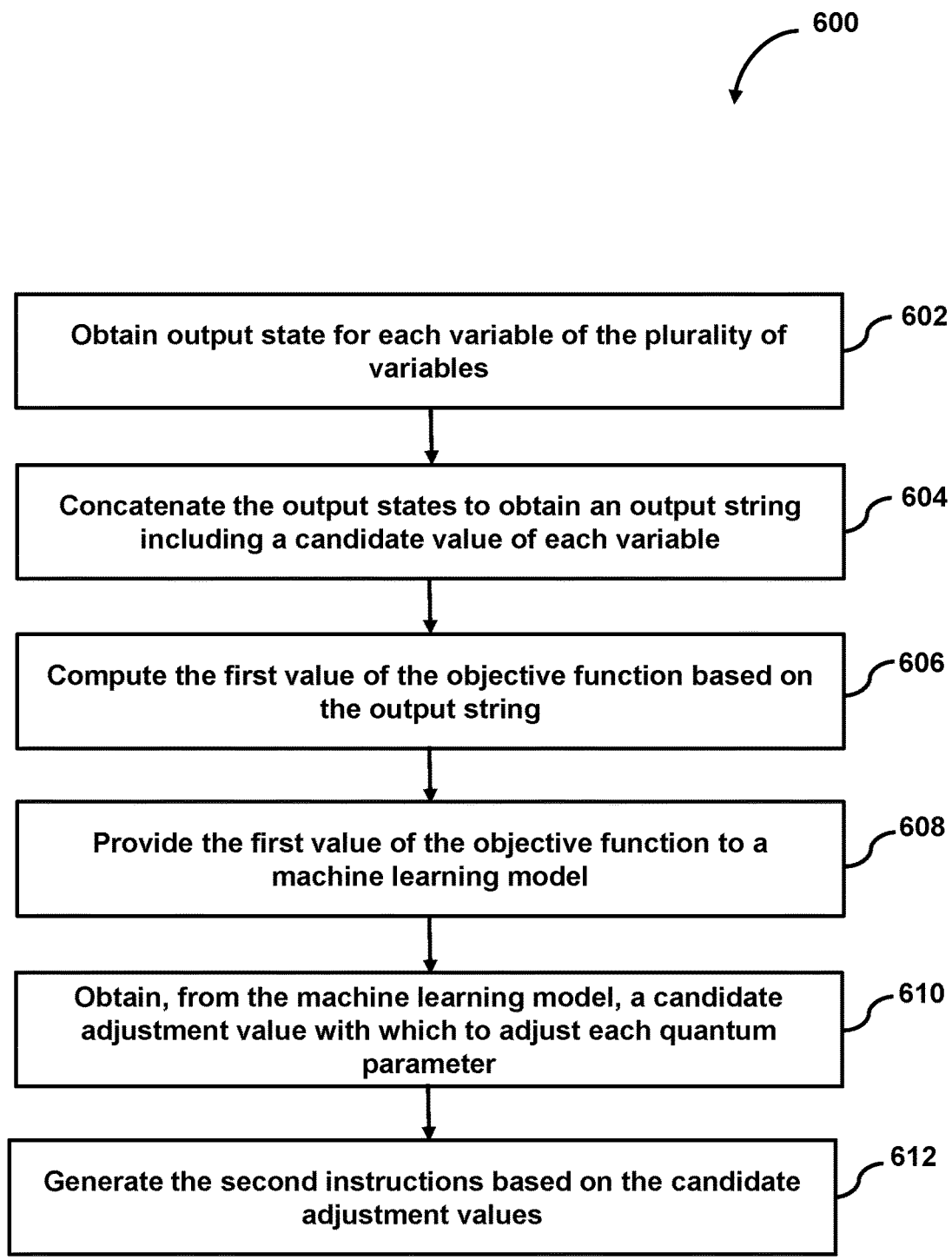
FIG. 6 is a flowchart that illustrates an example of a process for determining adjustments to quantum parameters associated with qubits, in accordance with one or more embodiments.

FIG. 6 is a flowchart that illustrates an example of a process 600 for determining adjustments to quantum parameters associated with qubits, in accordance with one or more embodiments. In some embodiments, process 600 may begin at step 602. At step 602, an output state for each variable of the plurality of variables may be obtained from quantum computing system 120. In some embodiments, the output states may be obtained in discrete sets, such as if multiple sets of variables are assigned to qubits of a same or separate QPUs, e.g., QPUs 122. For example, if there are two sets of variables, $\{x_0, x_1\}$ and $\{x_2, x_3\}$, then the first set of variables may be assigned to qubits of a first QPU (in the scenario where the QPU includes two qubits) and the second set of variables may be assigned to a second QPU. The output states may then be obtained, for each variable, from the first and second QPUs. As another example, where there are also two sets of variables, $\{x_0, x_1\}$ and $\{x_2, x_3\}$, but a single QPU, e.g., QPU 122, then the first set of variables may be assigned to the QPU and the output states obtained for those variables and, subsequently, the second set of variables may be assigned to the QPU and the output states obtained. In some embodiments, step 602 may be performed by a subsystem that is the same or similar to objective function computation subsystem 108.

At step 604, the output states for each variable may be concatenated to obtain an output string, where the output string includes a candidate value for each variable. Concatenating the output states may include computing a tensor product of the output states. For example, if the output states for variables $x_0, x_1, x_2, x_3$ are, respectively, $|0\rangle, |1\rangle, |1\rangle, |0\rangle$, then concatenating the output states can produce the output string $\{0, 1, 1, 0\}$, where the first value, 0, is associated with variable $x_0$, the second value, 1, is associated with the variable $x_1$, the third value 1, is associated with the variable $x_2$, and the fourth value 0, is associated with variable $x_3$. In some embodiments, step 604 may be performed by a subsystem that is the same or similar to objective function computation subsystem 108.

At step 606, the first value of the objective function may be computed based on the output string. For instance, the first value, e.g., a first expectation value, of the objective function may be computed based on the values of the output string. For example, for the output string $\{0, 1, 1, 0\}$ and the objective function Q, the expectation value is Q=0. In some embodiments, the expectation value for each iteration may be stored in memory of computing system 102, training data database 136, or both. In some embodiments, step 606 may be performed by a subsystem that is the same or similar to objective function computation subsystem 108.

At step 608, the first value of the objective function may be provided to a machine learning model. The machine learning model may be configured to determine an adjustment value for some or all of the quantum parameters of quantum computing system 120 based on the first value of the objective function. In some embodiments, the machine learning model may be trained within training data including sets of values for objective functions and corresponding adjustments made to quantum parameters based on respective values of the objective functions. In some embodiments, step 608 may be performed by a subsystem that is the same or similar to ML model subsystem 110.

At step 610, a candidate adjustment value, with which to adjust each quantum parameter of quantum computing system 120, may be obtained from the machine learning model. For instance, the machine learning model may take, as input, an expectation value of an objective function, and may output an adjustment value based on that expectation value. The adjustment value represents an amount with which a given quantum parameter is to be adjusted for a subsequent execution of the corresponding quantum operation. For instance, the adjustment value $\delta\theta$ may indicate an amount of adjustment to be applied to a quantum parameter $\theta$. In some embodiments, step 610 may be performed by a subsystem that is the same or similar to ML model subsystem 110.

At step 612, the second instructions (step 520) may be generated based on the candidate adjustment values. The second instructions, as mentioned above, may indicate how quantum computing system 120 should adjust one or more configurations to cause a given quantum parameter to be adjusted based on the corresponding candidate adjustment value. In some embodiments, step 612 may be performed by a subsystem that is the same or similar to instruction generation subsystem 112.

Figure 7:
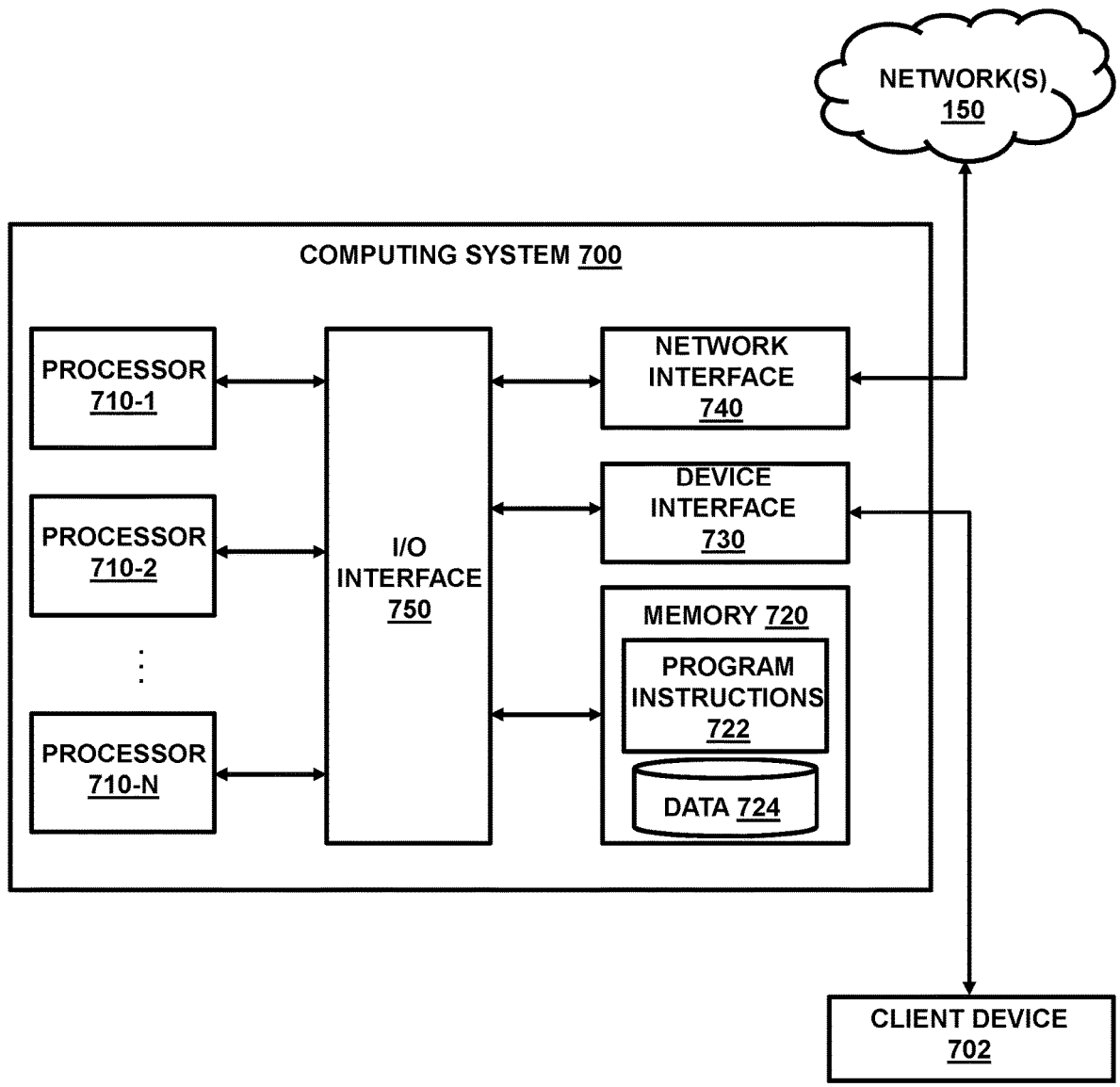
FIG. 7 illustrates an example of a computing device by which the present techniques may be implemented.

FIG. 7 is a diagram that illustrates an exemplary classical computing system 700 in accordance with embodiments of the present technique. Various portions of systems and methods described herein, may include or be executed on one or more computing systems similar to computing system 700. Further, processes and modules described herein may be executed by one or more processing systems similar to that of computing system 700. For example, computing system 102 may execute operations using a processing system that is the same or similar to computing system 700.

Computing system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computing system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 700 may include a plurality of computing devices (e.g., distributed computing systems) to implement various processing functions.

I/O device interface 730 may provide an interface for connection of one or more I/O devices 702 to computing system 700. I/O devices may include devices that receive input (e.g., from a user) or output information (e.g., to a user). I/O devices 702 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 702 may be connected to computing system 700 through a wired or wireless connection. I/O devices 702 may be connected to computing system 700 from a remote location. I/O devices 702 located on remote computer system, for example, may be connected to computing system 700 via a network, e.g., network(s) 150, and network interface 740.

Network interface 740 may include a network adapter that provides for connection of computing system 700 to a network. Network interface 740 may facilitate data exchange between computing system 700 and other devices connected to the network. Network interface 740 may support wired or wireless communication. The network, such as for example network(s) 150, may include an electronic communication network, such as the Internet, a local area network (LAN), a wide area network (WAN), a cellular communications network, or the like.

System memory 720 may be configured to store program instructions 722 or data 724. Program instructions 722 may be executable by a processor (e.g., one or more of processors 710a-710n) to implement one or more embodiments of the present techniques. Program instructions 722 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. a computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 750 may be configured to coordinate I/O traffic between processors 710a-710n, system memory 720, network interface 740, I/O devices 702, and/or other peripheral devices. I/O interface 750 may perform protocol, timing, or other data transformations to convert data signals from one component (e.g., system memory 720) into a format suitable for use by another component (e.g., processors 710-1-710-N). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 700 or multiple computing systems 700 configured to host different portions or instances of embodiments. Multiple computing systems 700 may provide for parallel or sequential processing/execution of one or more portions of the techniques described herein.

Those skilled in the art will appreciate that computing system 700 is merely illustrative and is not intended to limit the scope of the techniques described herein. Computing system 700 may include any combination of devices or software that may perform or otherwise provide for the performance of the techniques described herein. For example, computing system 700 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 700 may be transmitted to computing system 700 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method, comprising: identifying a quantum objective function determined based on a plurality of variables, wherein the plurality of variables is greater than two; (i) selecting an initial quantum state for a first variable and a second variable, the initial quantum state being assigned as a first input for a first solid state qubit and a second input for a second solid state qubit, wherein the plurality of variables comprise the first variable and the second variable; (ii) obtaining a first output quantum state for the first variable based on the first solid state qubit and a second output quantum state for the second variable based on the second solid state qubit; (iii) computing a first value for the quantum objective function based on the first output quantum state of the first variable and the second output quantum state of the second variable; (iv) adjusting a first rotation angle and a second rotation angle based on the first value; and repeating steps (i)-(iv) a predefined number of times to obtain a set of values for a quantum objective function, and a set of adjustments to the first rotation angle and a set of adjustments to the second rotation angle; obtaining, based on the set of values of the quantum objective function, the set of adjustments to the first rotation angle, and the set of adjustments to the second rotation angle, a first rotation adjustment value for the first rotation angle and a second rotation adjustment value for the second rotation angle; generating instructions to cause the first rotation angle associated with the first solid state qubit to be adjusted to the first rotation adjustment value and the second rotation angle associated with the second solid state qubit to be adjusted to the second rotation adjustment value; and sending the instructions to a quantum processing unit.

A2. The method of embodiment A1, wherein: selecting the initial quantum state further comprises selecting the initial quantum state for a third variable and a fourth variable, wherein the plurality of variables comprises the third variable and the fourth variable; and obtaining the first output quantum state and the second output quantum state further comprises obtaining a third output quantum state for the third variable based on a third solid state qubit and a fourth output quantum state for the fourth variable based on a fourth solid state qubit, wherein the first value for the quantum objective function is based on the first output quantum state, the second output quantum state, the third output quantum state, and the fourth output quantum state.

A3. The method of embodiment A1, further comprising: selecting the initial quantum state for a third variable and a fourth variable, wherein the plurality of variables comprises the third variable and the fourth variable the initial quantum state being assigned as a third input for the first solid state qubit and a fourth input for the second solid state qubit; and obtaining a third output quantum state for the third variable based on the first solid state qubit and a fourth output quantum state for the fourth variable based on the second solid state qubit, wherein: the first value for the quantum objective function is computed based on the first output quantum state, the second output quantum state, the third output quantum state, and the fourth output quantum state.

A4. The method of any one of embodiments A1-A2 or A1 and A3, wherein obtaining the first rotation adjustment value and the second rotation adjustment value comprises: providing the set of values of the quantum objective function, the set of adjustments to the first rotation angle, and the set of adjustments to the second rotation angle to a neural network, wherein the neural network is configured to take, as input, quantum objective function values and rotation angle adjustments for the first rotation angle and the second rotation angle, and output the first rotation adjustment value and the second rotation adjustment value.

A5. A hybrid computing system, comprising: a superconducting computing system comprising: a dilution refrigerator configured to maintain a cryogenic environment having an operating temperature of less than 100 mK; and a quantum processing unit, disposed within the dilution refrigerator, comprising a first superconducting quantum circuit including the first solid state qubit and the second solid state qubit, wherein the first solid state qubit is associated with a first rotation operation defined by the first rotation angle and the second solid state qubit is associated with a second rotation operation defined by the second rotation angle, wherein the first solid state qubit and the second solid state qubit are configured to operate in the cryogenic environment, and wherein the first superconducting quantum circuit comprises the first input and the first output for the first solid state qubit and the second input and the second output for the second solid state qubit; and a non-superconducting computing system comprising one or more classical processors configured to execute computer program instructions to effectuate operations comprising the method of any one of embodiments A1-A4.

A6. The hybrid computing system of embodiment A5, wherein the plurality of variables further comprises a third variable and a fourth variable, and the quantum processing unit further comprises a second superconducting quantum circuit, the second superconducting quantum circuit including a third solid state qubit and a fourth solid state qubit, wherein the third solid state qubit is associated with a third rotation operation defined by a third rotation angle and the fourth solid state qubit is associated with a fourth rotation operation defined by a fourth rotation angle, wherein the third solid state qubit and the fourth solid state qubit are configured to operate in the cryogenic environment, and wherein the second superconducting quantum circuit comprises a third input and a third output for the third solid state qubit and a fourth input and a fourth output for the fourth solid state qubit.

A7. The hybrid computing system of any one of claims A5-A6, further comprising: classical memory storing the computer program instructions.

A8. The hybrid computing system of any one of claims A5-A7, wherein the superconducting computer system includes solid state qubits formed via a lithographic fabrication process.

B1. A hybrid computing system comprising: a quantum computing system comprising one or more quantum processing units each capable of executing at least one quantum circuit, wherein each quantum circuit comprises a set of qubits, and each qubit is associated with a quantum operation defined by a quantum parameter; classical memory storing computer program instructions; and a classical computing system comprising one or more classical processors configured to execute the computer program instructions to effectuate operations comprising: identifying an objective function having a plurality of variables, wherein the plurality of variables comprises at least a first variable and a second variable; (i) selecting an initial state for the first variable and the second variable; (ii) obtaining, from the quantum computing system, and based on the initial state for the first variable and the second variable, a first output state for the first variable and a second output state for the second variable; (iii) computing a first value of the objective function based on the first output state and the second output state; (iv) adjusting the quantum parameter for each qubit of the set of qubits based on the first value; and repeating steps (i)-(iv) a number of times to obtain a set of values for the objective function and a set of adjustments to the quantum parameter for each qubit of the set of qubits; providing the set of values and the set of adjustments to a neural network to obtain an adjustment value for the quantum parameter associated with each qubit of the set of qubits; and sending instructions to the quantum computing system to cause the quantum parameter associated with each qubit of the set of qubits to be adjusted to a corresponding adjustment value associated with each quantum parameter.

B2. The hybrid computing system of embodiment B1, wherein: the quantum computing system includes less than 100 qubits; and the plurality of variables include greater than 1,000,000 variables.

B3. The hybrid computing system of any one of embodiments B1-B2, wherein: the plurality of variables includes a number of variables; the quantum computing system includes a number of qubits; and the number of variables is greater than the number of qubits.

B4. The hybrid computing system of any one of embodiments B1-B3, wherein the objective function comprises an optimization problem to be solved, wherein solving the optimization problem comprises determining a value for each of the plurality of variables that produces a minimum value for the optimization problem.

B5. The hybrid computing system of any one of embodiments B1-B4, wherein the quantum parameter comprises at least one of: an angle with which a given qubit from the set of qubits is rotated; or a strength with which two or more qubits of the set of qubits are coupled.

B6. The hybrid computing system of any one of embodiments B1-B5, wherein computing the first value comprises: concatenating the first output state and the second output state to obtain a value for a first qubit and a value for a second qubit, wherein the set of qubits comprises the first qubit and the second qubit; and inputting the value for the first qubit and the value for the second qubit into the objective function to obtain the first value.

B7. The hybrid computing system of any one of embodiments B1-B6, wherein obtaining the first output state and the second output state comprises: causing the quantum computing system to execute such that a first qubit and a second qubit of the set of qubits are each initialized to be in the initial state, wherein the quantum computing system outputs, to the classical computing system, the first output state and the second output state.

B8. The hybrid computing system of any one of embodiments B1-B7, wherein the plurality of variables further comprises a third variable and a fourth variable, the one or more quantum processing units comprising one quantum processing unit comprising a single quantum circuit, the set of qubits of the single quantum circuit comprises a first qubit and a second qubit, and selecting the initial state further comprises selecting the initial state for the first variable, the second variable, the third variable, and the fourth variable, the operations further comprise: obtaining, from the quantum computing system, based on the initial state for the third variable and the fourth variable, a third output state for the third variable and a fourth output state for the fourth variable, wherein the quantum computing system executes on the third variable and the fourth variable on the first qubit and the second qubit after the first variable and the second variable, and wherein the first value is computed based on the first output state, the second output state, the third output state, and the fourth output state.

B8. The hybrid computing system of any one of embodiments B1-B7, wherein the plurality of variables further comprises a third variable and a fourth variable, the one or more quantum processing units comprising a first quantum circuit and a second quantum circuit, the first quantum circuit comprises a first set of qubits including a first qubit and a second qubit, the second quantum circuit comprises a second set of qubits including a third qubit and a fourth qubit, and selecting the initial state further comprises selecting the initial state for the first variable, the second variable, the third variable, and the fourth variable, the operations further comprise: obtaining, from the quantum computing system, based on the initial state for the third variable and the fourth variable, a third output state for the third variable and a fourth output state for the fourth variable, wherein the quantum computing system executes: using the first quantum circuit, the first variable on the first qubit and the second variable on the second qubit, and using the second quantum circuit, the third variable on the third qubit and the fourth variable on the fourth qubit, and wherein the first value is computed based on the first output state, the second output state, the third output state, and the fourth output state.

B9. The hybrid computing system of any one of embodiments B1-B8, wherein the quantum computing system comprises: means for performing the quantum operation to obtain an output state of a given qubit of the set of qubits.

B10. The hybrid computing system of any one of embodiments B1-B9, further comprising: means for determining an output state of a given qubit of the set of qubits.

B11. The hybrid computing system of any one of embodiments B1-B10, wherein the number of times that steps (i)-(iv) repeated is predefined or dynamically determined.

B12. The hybrid computing system of any one of embodiments B1-B11, wherein adjusting the quantum parameter for each qubit comprises: providing the first value of the objective function to an additional neural network to obtain a candidate adjustment value indicating an amount with which to adjust the quantum parameter prior to repeating steps (i)-(iv); and generating additional instructions to cause the quantum parameter for each qubit of the set of qubits to be adjusted to the candidate adjustment value; and sending the additional instructions to the quantum computing system.

B13. The hybrid computing system of any one of embodiments B1-B12, wherein the quantum computing system comprises at least one of a gate model machine or a quantum annealer.

C1. A method, comprising: obtaining, with a computer system, a first set of raw outputs from a first plurality of shots run by a quantum processor processing a first part of a problem; obtaining, with the computer system, a second set of raw outputs from a second plurality of shots run by the quantum processor or another quantum processor processing a second part of the problem; statistically aggregating, with the computer system, the first set of raw outputs and the second set of raw outputs to determine an expectation value solving or approximating a solution to the problem; and storing, with the computer system, the expectation value in memory.

C2. The method of claim C1, comprising: using the expectation value to determine a direction in quantum parameter space in which to adjust quantum parameters to locally further optimize an objective function.

C3. The method of claim C1, wherein: the first plurality of shots is greater than 100; the first set of raw outputs comprises more than 5 values per output; each shot in the first plurality of shots is a quantum circuit repetition.

C4. The method of claim C1, wherein statistically aggregating comprises: grouping raw outputs in the first set of raw outputs that are identical with one another and determining respective counts of members for each group; and grouping raw outputs in the second set of raw outputs that are identical with one another and determining respective counts of members for each group.

C5. The method of claim C1, wherein statistically aggregating comprises: concatenating raw outputs in the first set of raw outputs with raw outputs in the second set of raw outputs by shot number, such that raw outputs having the same shot number are concatenated with one another to form concatenated raw outputs; and determining the expectation value based on a probability distribution of the concatenated raw outputs.

C6. The method of claim C5, wherein determining the expectation value comprises determining a measure of central tendency of at least some of the concatenated raw outputs.

C7. The method of claim C5, wherein determining the expectation value comprises determining a subset of the concatenated raw outputs having greater than a threshold frequency of occurrence in the concatenated raw outputs and determining the measure of central tendency based on the subset.

C8. The method of claim C1, wherein statistically aggregating comprises: ranking raw outputs in the first set of raw outputs according to frequency of occurrence in the first set of raw outputs to form a first ranking of raw outputs; ranking raw outputs in the second set of raw outputs according to frequency of occurrence in the second set of raw outputs to form a second ranking of raw outputs; concatenating raw outputs in the first ranking of raw outputs with raw outputs in the second ranking of raw outputs according to rank order to form concatenated raw outputs; and determining the expectation value based on a probability distribution of the concatenated raw outputs.

C9. The method of claim C8, wherein determining the expectation value based on the probability distribution of the concatenated raw outputs comprises selecting a most common concatenated raw output as the expectation value.

C10. The method of claim C8, wherein determining the expectation value based on the probability distribution of the concatenated raw outputs comprises determining a measure of central tendency from concatenated raw outputs having greater than a threshold frequency of occurrence in the concatenated raw outputs.

C11. The method of claim C1, wherein statistically aggregating comprises steps for statistically aggregating raw outputs.

What is claimed is:

1. A non-transitory, computer-readable medium storing instructions that when executed effectuate operations comprising:
obtaining, with a classical computer system, an objective function to be solved by a quantum computing system, wherein:
the objective function involves more variables than any of one or more quantum computers of the quantum computing system have logical qubits;
decomposing, with the classical computer system, the objective function into a plurality of sub-problems, each of the sub-problems involving as many or fewer variables than the one or more quantum computers have logical qubits;
causing, with the classical computer system, the quantum computing system to solve each of the sub-problems, wherein solving each of the sub-problems comprises:
obtaining a set of raw outputs from a plurality of shots run by the quantum computing system processing the given sub-problem, wherein obtaining a raw output from a shot run by the quantum computing system processing the given sub-problem comprises:
initializing initial states of the logical qubits of the quantum computing system, the initial states of the logical qubits corresponding to values of at least some variables of the objective function;
applying a given set of perturbations to the logical qubits; and
measuring the perturbed states of the logical qubits; and
wherein the measured perturbed states of the logical qubits represent raw output from the shot run; and
determining a solution to the given sub-problem based on an expectation value determined from the set of raw outputs, wherein determining the expectation value comprises:
determining a subset of the raw outputs having a greater than a threshold frequency of occurrence and determining the expectation value based on a measure of central tendency of the subset;
aggregating solutions to the sub-problems to determine a solution to the objective function, wherein aggregating solutions to the sub-problems to determine a solution to the objective function comprises determining the solution to the objective function based on the measured perturbed states of the logical qubits; and
storing, with the classical computer system, the solution to the objective function in memory.

2. The medium of claim 1, wherein decomposing the objective function into the plurality of sub-problems comprises:
decomposing the objective function based on a type of qubit with which the quantum computing system is implemented.

3. The medium of claim 1, wherein:
the variables are unknown variables of the objective function to be determined by solving the objective function.

4. The medium of claim 1, wherein the operations comprise:
iteratively, through a plurality of iterations, adjusting initial state values of the variables by, for each iteration, causing qubits of the quantum computing system to be initialized to current initial state values, obtaining outputs of the quantum computing system responsive to the current initial state values, determining adjustments to the current initial state values for a next iteration based on results of applying the outputs of the quantum computing system responsive to the current initial state values to the objective function.

5. The medium of claim 4, wherein the objective function is differentiable, and wherein the adjustments are determined by computing partial derivatives of the initial state values with respect to the objective function and determining, based on the partial derivatives, directions in which to adjust the initial state values between iterations.

6. The medium of claim 1, wherein:
at least some of the sub-problems are solved by different quantum computers of the quantum computing system; and
at least some of the sub-problems are solved by the same quantum computer of the quantum computing system at different times.

7. The medium of claim 1, wherein:
the solution to the objective function comprises finding values of the variables that produce a local or global optimum of the objective function; and
decomposing the objective function comprises decomposing a first quantum circuit into a plurality of smaller quantum circuits.

8. The medium of claim 1, wherein:
decomposing the objective function into the plurality of sub-problems comprises steps for decomposing the objective function; and
the quantum computing system comprises means for quantum computing.

9. The medium of claim 1, wherein initializing initial states of the logical qubits comprises initializing initial states of the logical qubits for a plurality of shots;
wherein applying a given set of perturbations to the logical qubits comprises applying the given set of perturbations to the logical qubits for the plurality of shots;
wherein measuring the perturbed states of the logical qubits comprises measuring the perturbed states of the logical qubits for the plurality of shots; and
wherein determining the solution to the objective function based on the measured perturbed states of the logical qubits comprises:
determining an expectation value based on the measured perturbed states of the logical qubits for the plurality of shots; and
determining the solution to the objective function based on the expectation value.

10. The medium of claim 9, wherein determining the expectation value comprises determining the expectation value based on a probability distribution of the measured perturbed states of the logical qubits for the plurality of shots.

11. The medium of claim 9, wherein determining the expectation value comprises determining the expectation value based on a subset of measured perturbed states which have a frequency of occurrence greater than a threshold.

12. The medium of claim 9, further comprising training a machine learning model, based on a subset of the plurality of shots, to determine the given set of perturbations to apply to the logical qubits based on the initial states of the logical qubits.

13. The medium of claim 9, further comprising training a machine learning model, based on a subset of the plurality of shots, to determine the initial states of the logical qubits based on the applied given set of perturbations.

14. A non-transitory, computer-readable medium storing instructions that when executed effectuate operations comprising:
   obtaining, with a classical computer system, an objective function to be solved by a quantum computing system, wherein:
      the objective function involves more variables than any of one or more quantum computers of the quantum computing system have logical qubits;
   decomposing, with the classical computer system, the objective function into a plurality of sub-problems, each of the sub-problems involving as many as or fewer variables than the one or more quantum computers have logical qubits;
   causing, with the classical computer system, the quantum computing system to solve each of the sub-problems, wherein solving each of the sub-problems comprises:
      obtaining a set of raw outputs from a plurality of shots run by the quantum computing system processing the given sub-problem, wherein obtaining a raw output from a shot run by the quantum computing system processing the given sub-problem comprises:
         initializing initial states of the logical qubits of the quantum computing system, the initial states of the logical qubits corresponding to values of at least some variables of the objective function;
         applying a given set of perturbations to the logical qubits; and
         measuring the perturbed states of the logical qubits; and
      wherein the measured perturbed states of the logical qubits represent raw output from the shot run;
   statistically aggregating solutions to the sub-problems to determine a solution to the objective function, the solution to the objective function comprise an expectation value solving the objective function wherein:
      statistically aggregating comprises determining the expectation value based on a probability distribution of at least some of the raw outputs of the plurality of sub-problems; and
      determining the expectation value comprises determining a subset of the raw outputs of each of the sub-problems having greater than a threshold of occurrence in the raw outputs and determining a central tendency based on the subset; and
   storing, with the classical computer system, the solution to the objective function in memory.

15. The medium of claim 14, wherein
   aggregating solutions to the sub-problems to determine a solution to the objective function comprises determining the solution to the objective function based on the measured perturbed states of the logical qubits.

16. The medium of claim 14, further comprising determining, with the classical computer system, a direction in parameter space in which to adjust parameters to further optimize the objective function and/or the plurality of sub-problems based on the expectation value.

17. A non-transitory, computer-readable medium storing instructions that when executed effectuate operations comprising:
   generating a set of training data for solving a multi-variable problem on a quantum computing system, comprising:
      initializing initial states of a set of qubits of the quantum computing system, wherein qubits of the set of qubits correspond to variables of the multi-variable problem;
      applying a given set of multi-variable perturbations to the set of qubits;
      measuring the perturbed states of the set of qubits corresponding to the initial states;
      determining an expectation value of the multi-variable problem based on the measured perturbed states;
      adjusting, based on the expectation value of the multi-variable problem, the initial states of the set of qubits to generate adjusted states;
      initializing the adjusted states of the set of qubits of the quantum computing system;
      applying the given set of multi-variable perturbations to the set of qubits;
      measuring the perturbed states of the set of qubits corresponding to the adjusted states;
      determine an adjusted expectation value of the multi-variable problem based on the measured perturbed states; and
      generating the set of training data from the expectation values corresponding to the adjusted states and adjustment values corresponding to differences between the initial states and the adjusted states of the set of qubits;
   based on the set of training data, training a machine learning model to adjust the set of qubits to optimize the value of the multi-variable problem; and
   storing parameters of the trained machine learning model in memory.

18. The medium of claim 17, wherein the multi-variable problem comprises more variables than the quantum computing system has qubits;
   wherein generating the set of training data comprises;
      mapping the multi-variable problem into a plurality of sub-problems comprising equal or fewer variables than the quantum computing system has qubits; and
      generating the set of training data for solving each of the plurality of sub-problems; and
   wherein training the machine learning model to optimize the value of the multi-variable problem comprises training a plurality of machine learning models to optimize the value of the plurality of sub-problems; and
   wherein storing the parameters of the trained machine learning model in memory comprises storing parameters of the plurality of machine learning models in memory.

19. The medium of claim 17, wherein the multi-variable problem comprises more variables than the quantum computing system has qubits and
   wherein generating the set of training data comprises;
      mapping the multi-variable problem into a plurality of sub-problems comprising equal or fewer variables than the quantum computing system has qubits; and
      generating the set of training data for solving each of the plurality of sub-problems; and wherein training the machine learning model to optimize the value of the multi-variable problem comprises training the machine learning model to map the multi-variable problem into the plurality of sub-problems.

20. The medium of claim 17, wherein training the machine learning model to optimize the value of the multi-variable problem comprises training the machine learning model to determine initial states of the set of qubits.

21. The medium of claim 17, wherein training the machine learning model to optimize the value of the multi-variable problem comprises training the machine learning model to determine a given set of multi-variable perturbations to be applied to the set of qubits.

22. A non-transitory, computer-readable medium storing instructions that when executed effectuate operations comprising:
   generating a set of training data for solving a multi-variable problem on a quantum computing system, wherein the multi-variable problem comprises more variables than the quantum computing system has qubits, comprising:
      mapping the multi-variable problem into a plurality of sub-problems comprising equal or fewer variables than the quantum computing system has qubits; and
      generating the set of training data for solving each of the plurality of sub-problems by:
      for each of a set of multi-variable perturbations:
         initializing initial states of a set of qubits of the quantum computing system, wherein qubits of the set of qubits correspond to variables of the multi-variable problem;
         applying a given set of multi-variable perturbations to the set of qubits by:
         initializing initial states of logical qubits of the quantum computing system, the initial states of the logical qubits corresponding to values of at least some variables of the multi-variable problem;
         applying a given set of perturbations to the logical qubits;
         measuring the perturbed states of the set of qubits; and
         determine a value of the multi-variable problem based on the measured perturbed states of the set of qubits;
   based on the set of training data, training a machine learning model to optimize the value of the multi-variable problem, wherein:
      training the machine learning model to optimize the value of the multi-variable problem comprises training a plurality of machine learning models to optimize the value of the plurality of sub-problems; and
      training the machine learning model to optimize the value of the multi-variable problem comprises training the machine learning model to map the multi-variable problem into the plurality of sub-problems;
      wherein training the machine learning model to optimize the value of the multi-variable problem comprises training the machine learning model to determine initial states of the set of qubits;
      wherein training the machine learning model to optimize the value of the multi-variable problem comprises training the machine learning model to determine a given set of multi-variable perturbations to be applied to the set of qubits; and
   storing parameters of the trained machine learning model in memory, wherein storing the parameters of the trained machine learning model in memory comprises storing parameters of the plurality of machine learning models in memory.

* * * * *